US008942012B2

(12) United States Patent
Louvel

(10) Patent No.: US 8,942,012 B2
(45) Date of Patent: Jan. 27, 2015

(54) METHOD OF FORMING A SWITCHED MODE POWER SUPPLY CONTROLLER DEVICE WITH AN OFF MODE AND STRUCTURE THEREFOR

(75) Inventor: Jean-Paul Louvel, Colomiers (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 194 days.

(21) Appl. No.: 13/362,186

(22) Filed: Jan. 31, 2012

(65) Prior Publication Data
US 2013/0193940 A1  Aug. 1, 2013

(51) Int. Cl.
  *H02M 1/36*  (2007.01)
(52) U.S. Cl.
  USPC ............................................. 363/49; 323/901
(58) Field of Classification Search
  CPC .............. H02M 2001/0032; H02M 2001/0035
  USPC ............................................. 363/49; 323/901
  See application file for complete search history.

(56) References Cited

U.S. PATENT DOCUMENTS

| 5,448,466 | A | 9/1995 | Erckert |
| 5,825,638 | A | 10/1998 | Shutts |
| 5,959,851 | A | 9/1999 | Shutts |
| 6,509,784 | B2 | 1/2003 | Seinen et al. |
| 7,440,296 | B2 | 10/2008 | Berghegger |
| 2005/0276083 | A1 | 12/2005 | Berghegger |
| 2007/0076447 | A1 | 4/2007 | Berghegger |
| 2007/0258272 | A1 | 11/2007 | Brown |
| 2008/0303491 | A1 | 12/2008 | Na |
| 2009/0115381 | A1 | 5/2009 | Zwerver |
| 2009/0146632 | A1 | 6/2009 | Julicher |
| 2010/0020575 | A1* | 1/2010 | Shimada .......................... 363/49 |
| 2010/0046253 | A1 | 2/2010 | Berghegger |
| 2011/0025286 | A1 | 2/2011 | Schroeder gennant Berghegger et al. |
| 2011/0211372 | A1 | 9/2011 | Wei et al. |

* cited by examiner

Primary Examiner — Harry Behm
Assistant Examiner — Matthew Grubb
(74) Attorney, Agent, or Firm — Rennie William Dover

(57) ABSTRACT

At least one embodiment is directed to a semiconductor voltage controller comprising: a start-mode circuit associated with a start-mode; and an off-mode circuit associated with an off-mode, where the voltage controller can be configured to receive a feedback signal and an off-mode signal from a single input and provide an output voltage, where the voltage controller can be configured to be in the off-mode when the feedback signal is less than a skip level and the feedback signal is less than a HV control level, and where the voltage controller can be configured to be in start mode when the feedback signal is greater than HV control level and Vcc is below a Vcc-start.

19 Claims, 17 Drawing Sheets

_US 8,942,012 B2_

1

METHOD OF FORMING A SWITCHED MODE POWER SUPPLY CONTROLLER DEVICE WITH AN OFF MODE AND STRUCTURE THEREFOR

BACKGROUND

The present invention relates, in general, to electronics, and more particularly, to semiconductors, structures thereof, and methods of forming semiconductor devices.

Current switch mode power supply controllers seek to maintain an output voltage level within a range (e.g., within Vcc-stop and Vcc-start), and send drive signals to regulate voltage within the range. Such regulation occurs whether an initially applied load changes or not, for example if initially there can be a load voltage on the system, the system will regulate the output voltage to provide the load voltage. However if conditions change so that there can be no longer any load for period of time, typical controller systems are unable to provide an off mode that allows the output voltage to drop outside of the range while there can be little load voltage and to quickly provide regulation again when a load can be redetected. If an off-mode can be provided typically its implementation requires an additional pin to a chip configuration that prohibits a simple plug and play implementation with existing pin connections, thus making such solutions difficult to implement in unmodified systems.

Accordingly, it can be desirable to have a method of providing an off-mode in a power controller where the semiconductor configuration does not require any additional pins to implement the off-mode.

BRIEF DESCRIPTION OF THE DRAWINGS

Embodiments of present invention will become more fully understood from the detailed description and the accompanying drawings, wherein.

DETAILED DESCRIPTION

Figure 1:
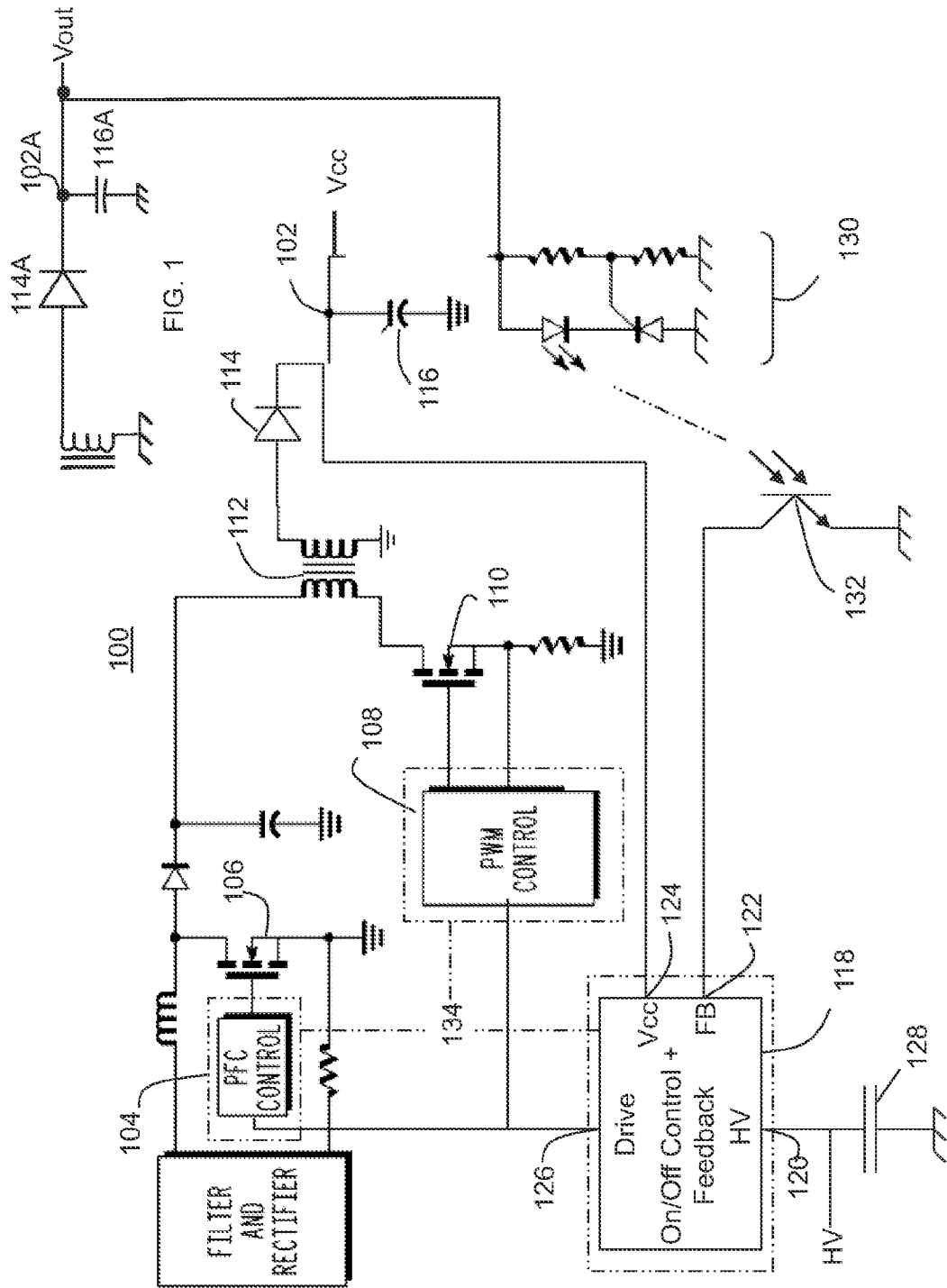
FIG. 1 schematically illustrates an embodiment of a portion of a system in accordance with an embodiment of the present invention.

For simplicity and clarity of the illustration, elements in the figures are not necessarily to scale, are only schematic and are non-limiting, and the same reference numbers in different figures denote the same elements, unless stated otherwise. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current flow through the device such as a gate of an MOS transistor or a base of a bipolar transistor. It will be appreciated by those skilled in the art that the words "during", "while", and "when" as used herein relating to circuit operation are not exact terms that mean an action takes place instantly upon an initiating action but that there may be some small but reasonable delay, such as a propagation delay, between the reaction that can be initiated by the initial action. Additionally, the term "while" means that a certain action occurs at least within some portion of a duration of the initiating action. The use of the word "approximately" or "substantially" means that a value of an element can have a parameter that can be expected to be close to a stated value or position. However, as can be well known in the art there are always minor variances that prevent the values or positions from being exactly as stated. It can be well established in the art that variances of up to at least ten percent (10%) (and up to twenty percent (20%) for semiconductor doping concentrations) are reasonable variances from the ideal goal of exactly as described.

When used in reference to a state of a signal, the term "asserted" means an active state of the signal and inactive means an inactive state of the signal. The actual voltage value or logic state (such as a "1" or a "0") of the signal depends on whether positive or negative logic can be used. Thus, "asserted" can be either a high voltage or a high logic or a low voltage or low logic depending on whether positive or negative logic can be used and negated may be either a low voltage or low state or a high voltage or high logic depending on whether positive or negative logic can be used. Herein, a positive logic convention can be used, but those skilled in the art understand that a negative logic convention could also be used. The terms "first", "second", "third" and the like in the Claims or/and in the Detailed Description of the Drawings, are used for distinguishing between similar elements and not necessarily for describing a sequence, either temporally, spatially, in ranking or in any other manner. It can be to be understood that the terms so used are interchangeable under appropriate circumstances and that the embodiments described herein are capable of operation in other sequences than described or illustrated herein.

In addition, the description illustrates a cellular design (where the body regions are a plurality of cellular regions) instead of a single body design (where the body region can be comprised of a single region formed in an elongated pattern, typically in a serpentine pattern). However, it can be intended that the description can be applicable to both a cellular implementation and a single base implementation.

In all of the examples illustrated and discussed herein, any specific materials, such as temperatures, times, energies, and material properties for process steps or specific structure implementations should be interpreted to be illustrative only and non-limiting. Processes, techniques, apparatus, and materials as known by one of ordinary skill in the art may not be discussed in detail but are intended to be part of an enabling description where appropriate. It should also be noted that the word "coupled" used herein implies that elements may be directly coupled together or may be coupled through one or more intervening elements. Additionally the term "configured" can refer to a hardware configuration that can be designed to provide a set of functions when operating, however does not require that the device be powered, only that the device can be "configured" to perform a function when powered. Thus a claim referring to a system configured to perform a function can be intended to encompass the system that can be designed to provide the function, whether or not powered, and such a system does not need to be powered to infringe the claim.

Note that similar reference numerals and letters refer to similar items in the following figures. In some cases, numbers from prior illustrations will not be placed on subsequent figures for purposes of clarity. In general, it should be assumed that structures not identified in a figure are the same as previous prior figures.

FIG. 1 can be an illustration of a switching power supply 100 including an output 102 in accordance with an embodiment. The output 102 can have a voltage Vcc that can be maintained within a predetermined voltage range during operation of a switch mode process. The predetermined voltage range can vary depending on the application and requirements of switching power supply 100. In the example, switching power supply 100 represents a common configuration comprising two stages of control. A first stage can be a power factor correction (PFC) stage 104 and a second stage can be a pulse width modulating stage 108. Note however that other embodiments may or may not include a PFC stage 104. In general, stages 104 and 108 increase the efficiency of the switching power supply 100 through active adjustments based on detected input and output conditions. In the example, switching power supply 100 can be coupled to an AC voltage, which can be rectified, filtered, and provided to the PFC stage 104 as an input voltage. PFC stage 104 generates a regulated voltage that can differ from the output voltage of power supply 100. PFC stage 104 can be isolated from the PWM stage 108 by a diode. PFC stage 104 regulates by enabling and disabling a switch 106. The diode when forward biased conducts current from PFC stage 104 charging a storage capacitor. As shown, the switch can be a transistor that can be controlled by the power factor correction stage 104 that adjusts a duty cycle of the enabled switch 106 in response to a signal corresponding to the regulated output voltage produced by PFC stage 104. More specifically, power factor correction makes adjustments to maintain an input current including a relationship in time and amplitude with the rectified input voltage provided thereto and with the output current drawn therefrom. The power factor correction circuitry typically keeps the power factor as close to unity as possible.

A second stage of switching power supply 100 can be a pulse width modulating (PWM) stage 108. PWM stage 108 comprises pulse-width modulating control circuitry, a switch 110, and a transformer 112. The storage capacitor can be coupled to a first terminal of the primary winding of the transformer 112. As shown, the switch 110 can be a transistor. The switch 110 can be coupled to a second terminal of the primary winding of the transformer 112. PWM stage 108 enables and disables the switch 110 based on an error signal. The error signal corresponds to a difference in the expected regulated output voltage of switching power supply 100 and the output voltage Vout. The voltage at the output Vout of switching power supply 100 varies over time due to variations in the loading at the output 102A. The loading at the output 102A of power supply 100 can vary from a no-load scenario to loading that approaches the maximum current rating. For example, if the loading on Vout increases, the PWM stage 108 detects the change and responds by raising the duty cycle to deliver power more frequently to the load and maintain or increase Vout. Conversely, the PWM stage 108 under reduced loading will lower the duty cycle to a level that maintains regulation. In general, the stages 104 and 108 will maintain the voltage at output 102A within the predetermined voltage range dictated by the power supply application.

PWM stage 108 can generate a regulated output voltage that differs from the regulated output voltage from PFC stage 104. The regulated output voltage from PWM stage 108 can be provided through the transformer 112 and output rectifier 114A. A storage capacitor 116A can be coupled to the output rectifier 114A. In the example, transformer 112 can be used to further modify the output voltage from PWM stage 108 to the regulated output voltage Vout of switching power supply 100. For example, transformer 112 can step down the voltage at the output Vout a multiple of the voltage delivered across the primary winding. As mentioned previously, the secondary transformer winding of transformer 112 can be coupled to output rectifier 114A. In the example, output rectifier 114A can be a rectifier diode including an anode coupled to a secondary transformer winding and a cathode to the regulated output voltage Vout. The storage capacitor 116A can be coupled to Vout to provide power to the load when not being delivered by stages 104A and 108. A resistor divider generates a voltage corresponding to the voltage at Vout that can be used to monitor changes. As shown, the changes in voltage across the resistor divider generates an error signal that can be coupled optically to a feedback pin (FB) or a feedback node of an On/Off Control+Feedback Circuit 118. For brevity, On/Off Control+Feedback circuit 118 will be called Feedback Control Circuit (FC) circuit 118 hereinbelow.

The output rectifier 114A can have two modes of operation in the switching power supply 100. In a first mode of operation, the output rectifier 114A can be in a high current path for driving the load coupled to the output Vout of switching power supply 100. The output rectifier 114A can couple PFC stage 104 and PWM stage 108 to the load through transformer 112 when the output rectifier 114A is forward biased. In a second mode of operation, the output Vout can be isolated by output rectifier 114A from PFC stage 104, PWM stage 108, and transformer 112. As mentioned previously, the storage capacitor 116A coupled to the output Vout delivers power to the load in the second mode of operation. The output rectifier 114A can stand off significant voltages while maintaining isolation between the output Vout and the regulation circuitry.

At least one embodiment includes a circuit and method for a high efficiency switch mode power supply including an off-mode. The off-mode can be integrated with additional circuitry that requires no additional pins to be added to the switch mode power supply controller integrated circuit. The different modes of operation are controlled through a feedback pin or feedback node of the switch mode power supply used for regulating the circuit. In one embodiment, the switch mode power supply controller can have three different modes of operation. In the first mode, a start process can be initiated. The start process occurs when the power supply is first turned on or after an off-mode. The start process provides a current to the Vcc 102 of the switching power supply 100 thereby moving the voltage Vcc towards the predetermined voltage range to maintain while under regulation during a switch mode process. In the currently discussed non-limiting example there is no feedback signal applied in the off-mode. In a second mode, the switch mode process can be enabled to support regulation at the output 102A of the switching power supply 100. Energy transfer occurs from transformer 112 to maintain the output 102A within the predetermined voltage range. As disclosed above, the duty cycle of the energy transfer changes with loading. For example, a high duty cycle can be required when the switching power supply 100 is heavily loaded requiring frequent energy transfer to maintain the voltage Vout within the predetermined voltage range. Alternatively, a light loading at output 102A requires a low duty cycle or infrequent energy transfer to maintain the voltage Vout within the predetermined voltage range. In the example, the feedback signal can be coupled to node 122 that will vary in magnitude such that the switch mode power supply controller can be enabled or disabled during regulation. Disabling the switch mode power supply controller stops the switch mode process thereby preventing the transfer of energy via the secondary winding of transformer 112 to the output 102A. As shown, a condition or status circuit 130 can be operatively coupled to node 122 for changing the mode of operation of power supply 100 via the feedback pin or feedback node. In one embodiment, the circuit 130 can be optically coupled to transistor 132 including a collector that can be coupled to the node 122. The third mode can be the off-mode that prevents the transfer of energy to the output 102A of the switching power supply 100. The off-mode will be explained in more detail herein below. In the off-mode, the voltage Vout at the output 102A of the power supply 100 can be allowed to fall outside of the predetermined voltage range, for example below the minimum voltage of the predetermined voltage range.

The off-mode can be a condition or operative mode of switching power supply 100 under a no-load condition. In general, the no-load condition occurs when little or no power is being delivered from the switching power supply 100 to a device coupled to the output 102A. Examples of a no-load condition comprises no device coupled to output 102A, the device coupled to output 102A can be turned off, or the device coupled to the output can be put into an energy conservation mode. The off-mode can be initiated when the no-load condition can be detected and a no-load signal can be provided to the node 122 that places the power supply 100 in the off-mode. The FC circuit 118 can be easily adapted to different switching power supply controller designs. The FC circuit 118 typically reduces power consumption to various designed levels, for example less than 30 milliwatts in the off-mode. Furthermore, in at least one embodiment the circuit works with a standard pin out of a switch mode power supply controller that does not include an off-mode. No additional pins are needed. The start mode, feedback mode, and off-mode can be implemented through the feedback path of the switch mode power supply controller. One benefit besides lower energy use is that manufacturers can retrofit to a new controller including off-mode without the redesign of their interface to a power supply system and more particularly the printed circuit board. Maintaining the form factor and pin out of the existing controllers reduces cost and lowers barrier to adoption while providing substantial long-term energy savings. A further benefit is that the over voltage protection or over current protection can be kept in place with no change in performance thereby maintaining existing safety behaviors.

The off-mode improves the efficiency of the switching power supply 100 by preventing the transfer of power to the output 102A for an extended period of time. The time between power transfers to adjust a voltage at the output 102A in off-mode can be greater than a switch mode power supply operating normally without off-mode capability. The switching power supply 100 dissipates minimal power during the off-mode thereby improving overall efficiency of the system over time. In the off-mode, the voltage at output 102A will decline over time albeit at significantly slower rate than when delivering power to a device. Leakage current and the feedback circuitry loading the output 102A cause a slow decline in output voltage. In one embodiment of the off-mode, the voltage at output 102A can fall below the predetermined regulated voltage range maintained during the switch mode process (~ from 30 s to 30 minutes).

In the off-mode, the voltage at output 102A continues to decline until a start mode occurs whereby current can be provided to the output 102A. The start mode is disclosed in more detail in subsequent figures below. The current provided to the Vcc 102 comes from a source other than the switch mode process. The start mode can be then disabled after the voltage at the Vcc 102 rises to a level that enables the switch mode process thereby transferring energy via the transformer 112. It should be noted that the time from off-mode to enabling the switch mode process can be accomplished in a very short period of time (~100 ms). This can be desirable as the switch mode power supply can rapidly change from a very power efficient state to providing current to a load with a regulated output voltage to enable a device (e.g. the load) in the shortest possible time. The voltage at output 102A will remain within the predetermined voltage range during regulation. If a no-load condition continued to exist, the switch mode process would remain disabled such that no energy can be transferred by transformer 112. The voltage at output 102A will continue to decline until the start mode occurs again as disclosed above. Similar to the off-mode, can be a standby, skip, or light load mode. The difference between the off-mode and the standby mode can be that the start mode may not be initiated. The switch mode process can be enabled periodically for a minimal time period to maintain the voltage at output 102A within the predetermined range.

In one embodiment, the FC circuit 118 can be integrated with other circuitry of a switch mode power supply controller as a single chip. In the example, the single chip can comprise PFC stage 104, PWM stage 108, and FC circuit 118 as indicated by dashed lines 134. The circuitry can be more or less than shown and the integration can vary depending on the power supply application. As shown, FC circuit 118 can have a node 120, a node 122, a node 124, and a node 126. Node 120 corresponds to a voltage HV that can be provided by FC circuit 118. A capacitor 128 can be coupled to node 120 to store energy. In the example, the current provided during the start mode from the off-mode can be provided by the source of voltage HV, capacitor 128, or both. A feedback pin or feedback node of the switch mode power supply controller corresponds to node 122 of FC circuit 118. A circuit 130 can be coupled to the output 102A or the Vcc 102 of the switching power supply 100. The circuit 130 generates a signal corresponding to the voltage Vout. The circuit 130 can further include circuitry for detecting the loading on the output 102A. The voltage Vout at output 102A can be a high voltage like 19 V used for Adaptors. In one embodiment, circuit 130 optically can be coupled to a feedback device 132. As shown, feedback device 132 can be a transistor that generates a current that corresponds to the voltage Vout, loading at output 102A, or both. The collector of the feedback device 132 can be coupled to the node 122. The FC circuit 118 also receives the voltage Vcc from the output 102 of switching power supply at node 124. Additionally, FC circuit 118 can have a node 126 that can be coupled to PFC stage 104 and PWM stage 108. The FC circuit 118 generates a drive signal that enables or disables the switch mode process that respectively transfers energy to the output 102A or prevents energy transfer from occurring.

It should be noted that the configuration of switching power supply 100 can be used to merely illustrate the general operation of a switch mode process to generate a regulated voltage. Furthermore, the description above can be an example of how the off-mode influences the power efficiency of the power supply 100. There are many types of switch mode power supplies and switch mode power supply architectures that can use off-mode to improve long-term power efficiency. The Feedback Control circuitry 118 can be adapted to different types of switch mode processes without increasing pin count of the controller circuitry. High volume commercial applications include low cost flyback circuits, notebook computer power supplies, and ATX power supplies all of which would benefit from the improved efficiency. Cost and performance are a factor in the selection of the technology used. Often, the initial cost of the supply can be chosen over the most efficient solution even though improved efficiency yields a lower cost long term due to reduced energy usage. The addition of FC circuit 118 can lower cost while improving performance.

Thus, the FC circuit 118 can be integrated into existing switch mode power supply controllers to improve operating efficiency thereby promoting the proliferation of more efficient power supplies to reduce long-term energy consumption. Moreover, the performance and cost improvements can be achieved with no added complexity to the power supply circuitry nor introduce changes in an assembly process. In other words, a performance improvement can be achieved by merely replacing the existing switch mode power supply controller disclosed herein below allowing rapid retrofitting for improving performance, lowering the barrier for adoption, and lowering cost of power supply integration.

Figure 2:
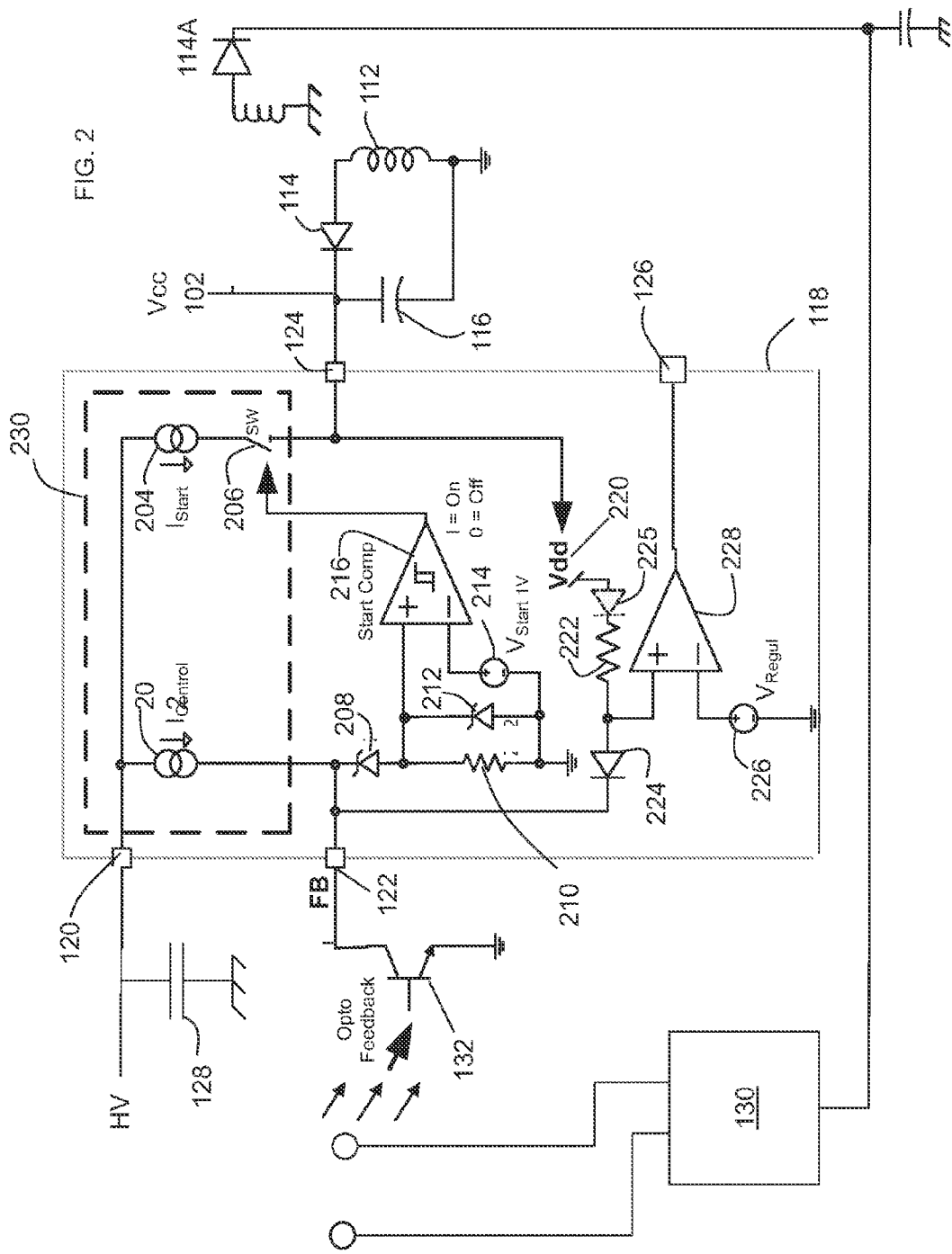
FIG. 2 schematically illustrates an embodiment of a portion of a system in accordance with an embodiment of the present invention.

FIG. 2 is a schematic diagram of the Feedback Control circuit 118 which can provide off-mode without increasing pin count in accordance with an embodiment. In the example, nodes 120, 122, 124, and 128 are pins of an integrated circuit. Nodes 120, 122, 124, and 128 respectively correspond to a voltage input, feedback, switch mode power supply Vcc supply, and controller drive that are either common pins or internal nodes of most switch mode power supply controllers thereby allowing integration of FC circuit 118 thereto. Alternatively, nodes 120, 122, 124, and 128 can be internal nodes of a power supply, circuit, or integrated circuit. The secondary side of power supply 100 comprises the secondary winding of transformer 112A, rectifier 114A, storage capacitor 116A, error signal circuitry, and condition or status circuitry 130 coupled thereto. The condition or status circuitry 130 includes the circuitry coupled to output 102A that can be optically coupled to transistor 132 which can provide a signal that controls the transitions between off-mode, start mode, and regulation mode. The condition or status circuitry 130 can also include a circuit to detect a no-load condition.

FC circuit 118 comprises a current source section 230, a start comparator 216, and a regulation comparator 228. A voltage HV can be provided to node 120 of the FC circuit 118. A storage capacitor 128 stores charge to deliver to the current source section 230 under a start mode. The start mode discussed herein can be used to rapidly raise the voltage at the Vcc 102 after the off-mode. The start mode can be used in other operating sequences of the switch mode power supply 100. The voltage HV coupled to node 120 should be greater than a regulated voltage at Vcc 102 of the power supply 100. The voltage HV can be regulated or unregulated. The current source section 230 comprises a current source 202, a current source 204, and a switch 206. In one embodiment, the current source 202 can have a first terminal coupled to node 120 and a second terminal coupled to the node 122. The current source 204 can have a first terminal coupled to the node 120 and a second terminal. The switch 206 can have a first terminal coupled to the second terminal of current source 204, a control terminal, and a second terminal coupled to the node 124. The node 124 can be coupled to the Vcc 102 of the switch mode power supply 100.

The FC circuit 118 can be coupled to or include current source 204 which can provide current to the Vcc 102 of the power supply 100 under start mode. The start circuitry comprises zener diode or resistance 208, resistor 210, zener diode 212, and the start comparator 216. In general, the start comparator 216 includes a positive input, a negative input coupled to a reference voltage, and an output coupled to the control electrode of switch 206. In the example, a high state at the output of start comparator 216 closes the switch 206 thereby coupling current source 204 to the Vcc 102. The zener diode 208 can have a cathode coupled to the node 122 and an anode coupled to a positive input of start comparator 216. Resistor 210 can have a first terminal coupled to the positive input of start comparator 216 and a second terminal coupled to ground. The zener diode 212 can have a cathode coupled to the positive input of the start comparator 216 and an anode coupled to ground. A voltage reference 214 provides a voltage Vstart to the negative input of the start comparator 216. The comparator 216 incorporates hysteresis whereby a transition from low to high state or high to low state occurs at different threshold voltages.

The FC circuit 118 further includes regulation comparator 228 which can provide a drive signal that can be coupled to the switch mode power supply controller to enable and disable a switch mode process. The circuit comprises resistor 222, diode 224, and the regulation comparator 228. In general, the regulation comparator 228 includes a positive input, a negative input coupled to a reference voltage, and an output which can provide the drive signal. In the example, the power supply 100 can transfer energy to the output 102 when the switch mode power supply controller can be enabled by the drive signal from regulation comparator 228. Conversely, no energy transfer occurs at output 102 from the switch mode process when the switch mode power supply controller is disabled by the drive signal from regulation comparator 228.

The resistor can have a first terminal coupled to receive an internal set voltage Vdd and a second terminal coupled to the positive input of the regulation comparator 228. The diode 224 can have an anode coupled to the positive input of the regulation comparator 228 and a cathode coupled to node 122. A voltage reference 226 provides a voltage Vregulation to the negative input of the regulation comparator 228. The output of regulation comparator 228 can be coupled to node 126. The voltage Vdd provided to the first terminal of resistor 222 corresponds to the supplyvoltage Vcc provided to node 124 of FC circuit 118. In one embodiment, the voltage Vdd can be translated from the voltage Vcc by a circuit. In general, the voltage Vdd can be fixed. Thus, the start comparator 216 and the regulation comparator 228 support start, regulation, and off-mode processes via a signal applied to the feedback node 122.

Figure 3:
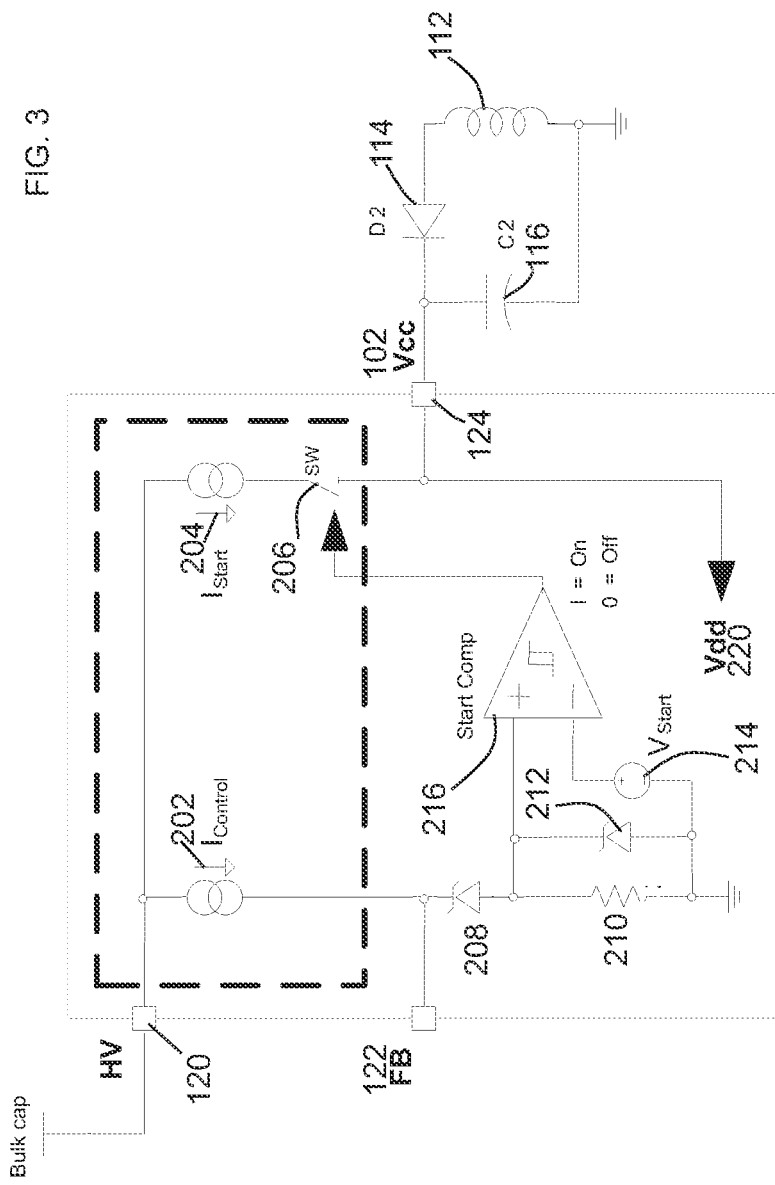
FIG. 3 schematically illustrates an embodiment of a portion of a circuit that can be a portion of the system of FIG. 2 in accordance with an embodiment of the present invention.

FIG. 3 is a schematic diagram of circuitry for a start mode in accordance with an embodiment. As mentioned previously, the start mode can occur when the power supply 100 is first turned on or from the off-mode. In general, the voltage Vcc at the output 102 of power supply 100 can be out of the predetermined voltage range maintained during regulation. The start mode can be enabled to deliver current to the output 102 thereby raising the voltage thereon. A different operational sequence can be used when initially powering up the switch mode power supply 100. The start mode described herein can be used at least when transitioning from the off-mode. The current from current source 204 during the start mode raises the voltage Vcc at 102 to a predetermined voltage that starts the switch mode process.

Prior to start mode, a signal applied to node 122 sinks the current from current source 202 such that the zener diode 208 is non-conductive. Zener diode 208 is non-conductive when the voltage at node 122 is insufficient to induce breakdown. The voltage at the positive input of start comparator 216 is approximately a ground potential when zener diode 208 is non-conductive. The reference voltage Vstart coupled to the negative input of start comparator 216 can be greater than ground thereby generating a "0" or low state at the output of start comparator 216. The low state at the output of the start comparator 216 maintains switch 206 in the open state such that current source 204 does not provide current to the Vcc 102 of the power supply 100.

The voltage will rise at node 122 when the signal applied to node 122 can no longer sink the current from current source 202. The voltage will rise above the breakdown voltage of zener diode 208 above a predetermined sink current applied to node 122. Zener diode 208 then breaks down above a predetermined voltage such that resistor 210 and zener diode 208 conduct current. The voltage at the positive input of the start comparator 216 will increase with increasing current conducted by resistor 210. The output of start comparator 216 switches from the low state to a "1" or high state when the voltage at the positive input of start comparator 216 is greater than the reference voltage 214 (Vstart) coupled to the negative input of start comparator 216. The high state at the output of start comparator 216 enables or closes the switch 206 coupling the current source 204 to the node 124 and the Vcc 102 of the power supply 100.

As mentioned previously, the switch mode process can be off during start mode. A negative voltage differential can be generated across the +/− inputs of the regulation comparator 228 (FIG. 4) due the voltage Vdd being less than the reference voltage 226 (Vregulation). Details will be described in more detail herein below. The current from current source 204 charges storage capacitor 116 thereby increasing the voltage Vcc. The magnitude of voltage HV and the charge stored on storage capacitor 128 can be sufficient to rapidly raise the voltage at the output 102 to a start output voltage that initiates the switch mode process. As discussed above, raising Vcc also increase Vdd. The zener diode 212 clamps the voltage at the positive input of start comparator 216 from going above a breakdown voltage of the zener diode 212.

Figure 4:
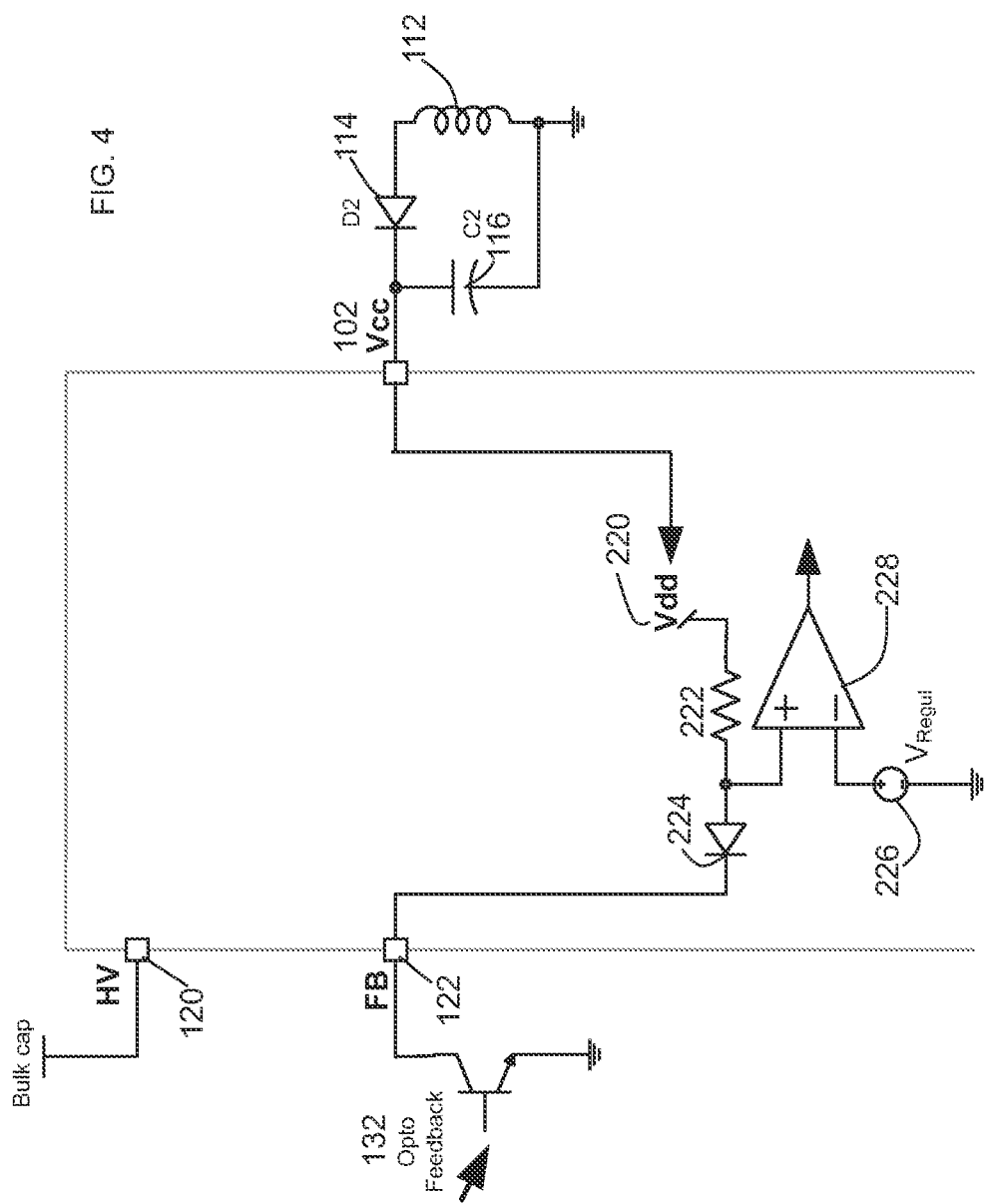
FIG. 4 schematically illustrates an embodiment of a portion of a circuit that can be a portion of the system of FIG. 2 in accordance with an embodiment of the present invention.

FIG. 4 is a schematic diagram of circuitry for a switch mode process to maintain the output 102A between a predetermined voltage range in accordance with an embodiment. In the example discussed above, the current from current source 204 (FIG. 3) increases the voltage Vcc at the output 102. At a predetermined voltage at the output 102A, a magnitude can be reached where the optical diode of a condition and status circuitry 130 begins conducting a current. An optical signal can be coupled to transistor 132 where it can be converted to a base current that corresponds to the output voltage Vout. The base current enables transistor 132 to sink current at node 122. The base and collector current of transistor 132 increases with rising voltage Vout at output 102A. The collector current of transistor 132 at the predetermined voltage at the output 102A can be sufficient to force the voltage at node 122 to fall until zener diode 208 is non-conductive. The predetermined voltage where zener diode 208 becomes non-conductive can be the voltage Vstart as will be discussed in more detail below. The positive input of start comparator 216 falls to ground via resistor 210 when zener diode 208 becomes non-conductive. The reference voltage 214 can be greater than the ground voltage at the positive input of start comparator 216 producing a transition from the "1" or high state to a "0" or low state at the output of start comparator 216. The low state opens the switch 206 decoupling current source 204 from the Vcc supply 102 which prevents the voltage Vcc from increasing greater than the voltage Vstart.

In general, the switch mode process provides power to a load and storage capacitor 116A coupled to the output 102A. The switch mode process regulates or maintains the voltage Vout at output 102 within a predetermined voltage range. As mentioned previously, the optical feedback to transistor 132 corresponds to the voltage Vout at output 102. The frequency or amount of energy transfer corresponds to the loading at output 102. For example, an increase in loading will produce a corresponding negative rate of change at the output 102. The negative rate of change can be detected by the switch mode power supply controller thereby increasing the frequency or amount of energy transferred over a period of time to counter the trend and to keep the voltage Vout above the minimum voltage of the predetermined voltage range. In one embodiment, the increase in frequency or amount of energy transfer changes the rate of change from negative to positive thereby increasing the voltage Vout at the output 102A. Conversely, the transfer of energy can be reduced under lightly loaded conditions to stop a positive rate of change in the energy transfer that would eventually increase the voltage Vout above the maximum voltage of the predetermined voltage range.

The regulation comparator 228 provides a drive signal to the switch mode power supply controller that enables the switch mode process to regulate the voltage at the output 102A. In the example, this corresponds to a signal transition from no-signal at node 122 (e.g. start mode) to optical feedback enabling transistor 132 (e.g. regulation mode) to sink current from node 122 when the voltage at supply 102 reaches the voltage Vstart. In one embodiment, the output regulation comparator 228 transitions from the low state to the high state after current source 204 is decoupled from the Vcc 102. The positive voltage differential from the positive input to the negative input of the regulation comparator 228 can be a function of the voltage at node 122 and the voltage Vdd at the first terminal of resistor 222. The voltage Vdd can be the voltage Vcc or a voltage corresponding to the voltage Vcc.

For example, the voltage Vdd can be scaled from the voltage Vcc to determine a switch point with the reference voltage 226. Vdd can also be an internal reference voltage that is predetermined.

The voltage at node 122 during the start mode can be approximately the breakdown voltage of zener diode 208 and the voltage across resistor 210. The diode 224 becomes conductive when the voltage Vdd is greater than the voltage at node 122 and the forward diode voltage drop of diode 224 when conducting. Prior to the transition from start mode to regulation mode, diode 224 is non-conductive. The non-conductive state of diode 224 results in the voltage at the positive input of comparator 228 being the voltage Vdd. In one embodiment, the voltage Vcc at the output 102 of the power supply 100 is less than a minimum regulated voltage prior to the start mode. The voltage Vdd corresponding to the voltage Vcc that is less than the minimum regulated voltage can be less than the reference voltage 226 or Vregulation. Thus, the output of regulation comparator 228 can be in the low state under the condition listed above. Note that during the start mode, the voltage Vcc at the output 102 of the power supply 100 can be rapidly changing due to the current provided by current source 204. Thus, the low state at the output of comparator 228 disables the switch mode power supply controller from transferring energy to the Vcc supply 102 during the start mode.

Prior to enabling the switch mode process in regulation mode, the diode 224 isolates node 122 from the positive input of regulation comparator 228. The diode 224 introduces an offset on the positive input of regulation comparator 228 that does not affect performance. In one embodiment, the transition from start mode to the regulation mode occurs when the voltage Vcc at the output 102 reaches Vstart. The voltage Vdd can be at a voltage corresponding to Vstart. In the example, the diode 224 can be conducting when the output 102 is at the voltage Vstart. In other words, the voltage Vdd when the output 102 is at the voltage Vstart is greater than the voltage at anode 122 plus a forward voltage drop of diode 224. The voltage at the positive input of comparator 228 can be approximately the voltage at node 122 plus the forward voltage drop of diode 224. In this condition, the voltage at the positive input of regulation comparator 228 can be greater than the regulation voltage 226 or Vregulation. The output of regulation comparator 228 then transitions from the "0" or low state to a "1" or high state. The high state at the output of regulation comparator 228 can be coupled to the switch mode power supply controller to enable the switch mode process.

Enabling the switch mode process allows the transfers energy to the output 102A of the power supply 100 and establishes regulation to maintain the voltage Vout within the predetermined voltage range. It should be noted that energy transfer can be controlled by the switch mode power supply controller. The switch mode process can be enabled to allow the transfer of energy as long as the output of the regulation comparator 228 is in the high state. The amount of feedback provided to node 122 and the voltage Vdd operatively determines if the switch mode process can be enabled or disabled. In one embodiment, the output of regulation comparator remains in the high state during the regulation mode thereby maintaining the voltage Vout at the output 102A of the power supply 100 within a regulated voltage range.

In the case when the output 102A is lightly loaded an increase in power efficiency can be achieved by disabling the switch mode process. This configuration can be known as a skip mode or a standby mode. The switch mode process can be enabled and disabled to respectively transfer energy to the output 102A and then disable the energy transfer process. The switch mode power supply controller can be disabled for an extended period of time depending on how light the load can be at the output 102A. In the skip mode, the voltage Vout can be maintained at the lower portion of the regulated voltage range to further minimize power consumption. Moreover, in at least one embodiment, while in the skip mode, the voltage Vout is not allowed to fall outside the regulated voltage range.

Figure 5:
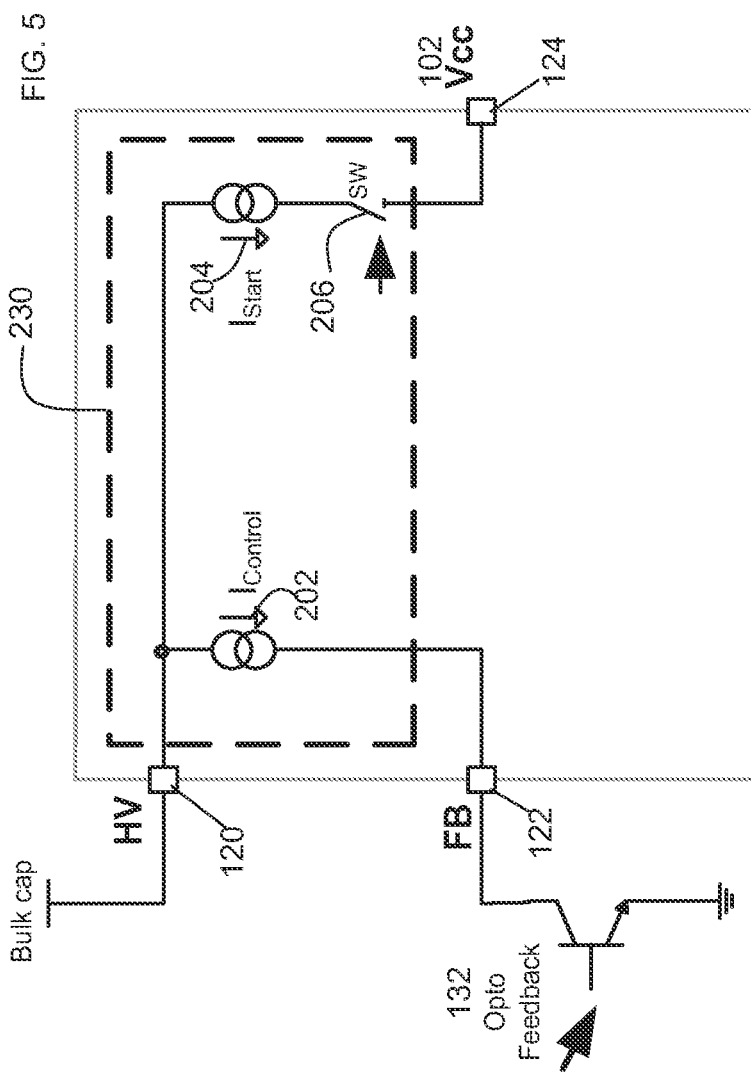
FIG. 5 schematically illustrates an embodiment of a portion of a circuit that can be a portion of the system of FIG. 2 in accordance with an embodiment of the present invention.

FIG. 5 is a schematic diagram of circuitry for an off-mode process in accordance with an embodiment. In at least one embodiment, condition or status circuitry 130 (FIG. 2) includes an automatic no load detection circuit. The automatic no load detection circuit detects when there is no load coupled to the output 102A of the power supply 100. In the example, the no load detection circuit enables the transistor 132 to drive the node 122 to approximately ground. In an alternate embodiment, the no load detection circuit can have an output coupled to node 122 that drives node 122 to ground when no load is detected. In general, detecting a no-load condition at the output 102A of the power supply 100 transitions the signal at node 122 to the off-mode (e.g. ground). The switch mode process can be disabled upon detecting the no-load condition thereby stopping the transfer of energy to the output 102A of the power supply 100.

The base current provided to transistor 132 when a no-load condition is detected turns the device on such that the collector sinks current sufficiently enough to hold node 122 at ground. Node 122 at ground renders zener diode 208 non-conductive. The voltage at the positive input of start comparator 216 can be driven to ground through resistor 210 when zener diode 208 is non-conductive. The voltage at the negative input of start comparator 216 can be greater than the voltage at the positive input when node 122 is at ground. The output of start comparator 216 transitions from the "1" or high state to the "0" or low state or remains in the low state depending on the initial condition of start comparator 216.

The diode 224 (FIG. 4) conducts a current when node 122 is at ground. The voltage at the positive input of the regulation comparator 228 is at approximately the forward voltage drop of diode 224. In the example, the voltage at the positive input of regulation comparator 228 is less than the reference voltage 226 coupled to the negative input. The output (e.g. drive signal) of the regulation comparator 228 can be at "0" or low state when the reference voltage 226 is greater than the voltage at the positive input. As mentioned previously, the drive signal in the low state disables or prevents the transfer of energy by a switch mode process to the output 102A of the power supply 100. In the off-mode, little to no energy is provided to the storage capacitor 116. The storage capacitor 116A will slowly discharge over time during the off-mode due to leakage currents. Holding the node 122 at ground allows the voltage Vout to fall out of regulation and below the minimum voltage of the predetermined voltage range when regulated because both the outputs of start comparator 216 and regulation comparator 228 are in the low state. The voltage Vout continues to fall until the output 102A reaches a predetermined voltage that can be below the minimum regulated voltage at the output 102A in the off-mode. In one embodiment, the output 102A upon reaching the predetermined voltage below the minimum regulated voltage results in the condition or status circuitry 130 no longer providing an optical signal to the transistor 132. The transistor 132 is disabled or turned off when no optical signal is provided such that no current is conducted by the device. A transition from off-mode to start mode then occurs. The voltage at node 122 will start to rise from current provided by current source 202. The start mode can be initiated when zener diode 208 becomes conductive as disclosed above. The start mode can be coupled current source 204 to the Vcc supply 102 stopping the discharge of storage capacitor 116 and rapidly raises the voltage Vcc to the voltage Vstart.

Figure 6:
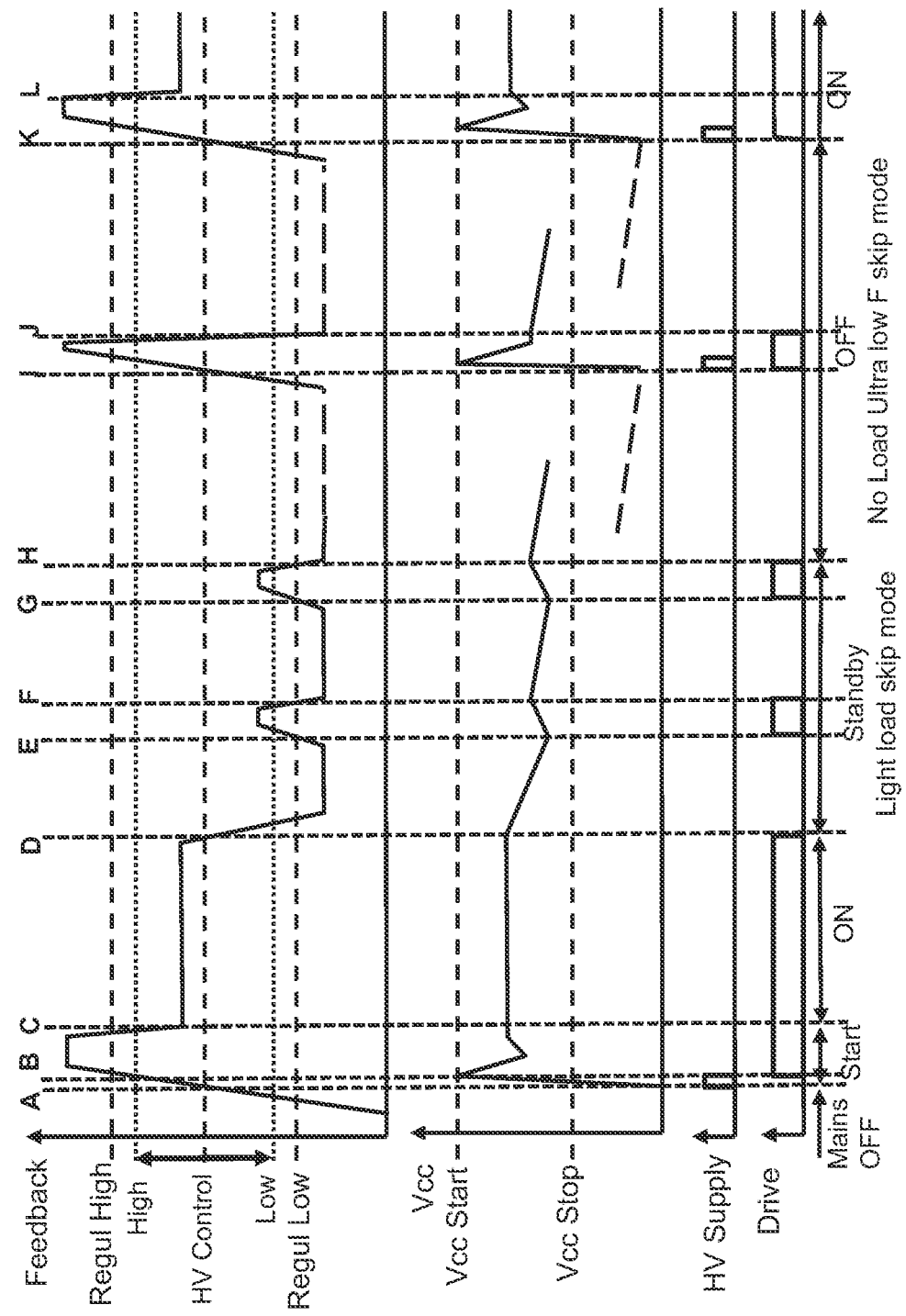
FIG. 6 illustrates a portion of signals that can occur during a portion of the operation of a portion of a system of an embodiment of the present invention.

FIG. 6 is a timing diagram illustrating start mode, regulation mode, and off-mode operating cycles of the switch mode power supply controller and more specifically the operation of FC circuit 118 in accordance with an embodiment. FIGS. 1 and 2 can be referred to when describing circuit components. The status of the circuitry of FC circuit 118 will be used to describe operational changes that result in the different modes being implemented through the feedback pin or feedback node of the power supply 100. Prior to A the power supply can be off and the voltage HV is not provided to node 120. At step A, voltage HV is provided to node 120, voltage Vcc is at ground, and the transistor 132 is off. In the example, the voltage HV can be greater than the maximum regulated voltage Vcc Start The outputs of both the start comparator 216 and the regulation comparator 228 can be in a low state such that the switch mode power supply controller is disabled from transferring energy to the output 102A. No feedback signal is provided to node 122. The start mode can be initiated by FC circuit 118 when the output of comparator 216 transitions from the low state to a high state. The output of comparator 228 remains in the low state preventing the transfer of energy by the switch mode process. The start mode couples the current source 204 to the node 102 and charges the storage capacitor until the voltage Vcc at node 102 equals the voltage Vcc Start.

At step B, the regulation mode can be initiated by FC circuit 118. The output of comparator 216 transitions from the high state to the low state when the supply 102 reaches the voltage Vcc Start. The transistor 132 can be enabled through the optical feedback corresponding to the voltage at the output 102A. Transistor 132 provides the feedback signal to node 122. The current source 204 can be decoupled from the node 102 of the power supply 100 preventing further increase in the voltage Vcc.

The feedback signal at node 122 and an increase in the voltage Vdd produces a change in comparator 228. The output of comparator 228 transitions from the low state to the high state providing a drive signal for enabling the switch mode power supply controller to transfer energy to the output 102A as required by the switch mode process. Although the switch mode power supply controller is enabled, no transfer of energy occurs in step B. The voltage Vcc falls after step B from the peak voltage Vcc Start due to loading on the supply 102 of the power supply 100 until the switch mode process transfers energy to maintain regulation.

From step C to step D, the power supply 100 operates in the regulation mode as a normal switching power supply. The switch mode power supply controller controls the frequency or amount of energy transfer to maintain the voltage Vout at the output 102A to the requested and regulated value. The supply Vcc is kept between the voltage Vcc Start and the voltage Vcc Stop. The rate of energy transfer will vary with variations in loading. The regulation mode maintains the voltage Vout at the output 102 within this range when the switch mode process is enabled. Optical feedback corresponding to the voltage Vout and more specifically to a voltage within the regulated voltage range can be provided during regulation. The feedback signal to node 122 and the voltage Vdd enable the switch mode process. Thus, the output of comparator 228 stays in the high state (e.g. drive signal) during regulation thereby providing the drive signal to sustain the regulation mode operation of FC circuit 118. The output of the start comparator 214 remains in the low state during regulation due to the voltage Vcc at supply 102 being greater than Vcc Stop. Current source 204 can be decoupled from the Vcc supply 102.

In step D, a lightly loaded condition occurs where keeping the switch mode process enabled would decrease the power efficiency. The lightly loaded condition can be also called standby or skip mode. In skip mode, the voltage supply Vcc declines at a much slower pace when a normal load is coupled to the output 102A. The output of comparator 228 transitions from the high state to a low state when the skip or standby mode is initiated in the step D. The drive signal in the low state disables the switch mode power supply controller from transferring energy to the output 102A.

In step E, the power supply 100 can be in the skip or standby mode. The output 102A can be lightly loaded allowing an extended period of time before the transfer of energy is required to maintain regulation. In the skip mode, the switch mode process can be enabled before the voltage Vcc falls to Vcc stop or below. A signal can be provided to the node 122 that transitions the regulation comparator 228 from the low state to the high state. The drive signal in the high state enables the switch mode power supply to engage the switch mode process. The transfer of energy to the output 102A of the power supply 100 by the enabled switch mode process raises also the voltage Vcc as shown in step E.

In a step F, the lightly loaded condition continues to exist. Referring back to step E, energy was transferred to raise the voltage Vout. The skip mode can be reinstated upon detecting the lightly loaded condition. The output of comparator 228 transitions from the high state to a low state upon initiating the skip mode similar to step D. The drive signal in the low state disables the switch mode power supply controller from transferring energy to the output 102A.

In a step G, the power supply 100 is in the skip or standby mode. The output 102A can be lightly loaded allowing an extended period of time before the transfer of energy can be required to maintain regulation. As disclosed in step E, the switch mode process can be enabled before the voltage Vcc falls to Vcc stop or below. A signal can be provided to the node 122 that transitions the regulation comparator 228 from the low state to the high state. The drive signal in the high state enables the switch mode power supply to engage the switch mode process. The transfer of energy to the output 102A of the power supply 100 by the enabled switch mode process raises the voltage Vout as shown in step G.

In step H, a no-load condition can be detected at the output 102A. The detected no-load condition initiates an off-mode by FC circuit 118. The off-mode transitions the node 122 to ground. The node 122 at ground holds the outputs of comparator 214 and comparator 228 in the low state. The switch mode process is disabled preventing the transfer of energy to the output of 102A. The off-mode differs from the skip mode by allowing the voltage Vcc at the supply 102 to fall below the voltage Vcc Stop corresponding to the minimum voltage under regulation.

In a step I, the voltage Vcc can have fallen below the voltage Vcc Stop. A start mode can be initiated when the optical feedback collapses due to the voltage at output 102A or when the signal enabling transistor 132 to hold node 122 ground is removed. In either case, the start mode can be initiated because no signal is provided to node 122. The start comparator 216 transitions from the low state to the high state when no-signal is applied to node 122. The current source 204 is then coupled to the supply 102 thereby raising the voltage Vcc. The off mode transitions to the start mode when the current source 204 raises the voltage at the Vcc supply to 102 Vcc Start.

The voltage Vcc Start on the supply 102 enables optical feedback to the transistor 132. The transistor 132 reduces the voltage on node 122 causing the start comparator 216 to transition from the high state to the low state. The low state at the output of start comparator 216 decouples the current source 204 from Vcc supply 102 thereby preventing a further increase in the voltage Vcc. The voltage on node 122 causes the output of regulation comparator 228 to transition from the low state to the high state. The drive signal in the high state enables the switch mode power supply controller to transfer energy to the output 102A if required. The voltage Vcc at Vcc start allows SMPS to transfer energy to output 102A as requested by level of node 122. The voltage Vcc declines over an extended period of time to the level corresponding to the regulation level (lower than Vcc start). As discussed above, the switch mode process or regulation mode can be enabled during step I and will regulate the voltage VoutNote that the initiated start mode allows the system to be supplied to be able to regulate the output voltage by transferring the energy requested to keep the output voltage to the requested level.

In a step J, the power supply 100 changes from the regulation mode to the off-mode. In one embodiment, the regulation mode transitions through the skip mode and then to off-mode. A lightly loaded condition can be detected and the skip mode can be initiated. In the skip mode, the signal at node 122 causes the output of the regulation comparator 228 to transition from the high state to the low state. In other words, the signal at node 122 can be less than a skip level that initiates the skip or standby mode. The drive signal in the low state disables the switch mode power supply controller from transferring energy to the output 102A. The voltage Vout continues to decline over an extended period of time. A no-load condition can be detected prior to transitioning to a regulation mode during the skip mode. The detection of the no-load condition initiates the off-mode that transitions the node 122 to ground. The voltage Vcc can be then allowed to fall below Vcc Stop as shown in step J. The current source 204 remains decoupled from supply (node 102) during the skip mode and the off-mode.

In a step K, the voltage Vcc can have fallen below the voltage Vcc Stop similar to step I. The start mode can be initiated because no signal can be provided to node 122. The start comparator 216 transitions from the low state to the high state when no-signal can be applied to node 122. The current source 204 is then coupled to the output 102 thereby raising the supply voltage Vcc. The start mode transitions to the regulation mode when the current source 204 raises the voltage at node 102 to Vcc Start.

The voltage Vcc Start on the node 102 enables optical feedback to the transistor 132. The transistor 132 reduces the voltage on node 122 causing the start comparator 216 to transition from the high state to the low state. The low state at the output of start comparator 216 decan be coupled the current source 204 from node 102 thereby preventing a further increase in the voltage Vcc. The voltage on node 122 causes the output of regulation comparator 228 to transition from the low state to the high state. The drive signal in the high state enables the switch mode power supply controller to transfer energy to the output 102A if required. The voltage Vcc at Vcc start supply the SMPS to allow transfer of energy if needed. The voltage Vout declines over an extended period of time as no energy is transferred to the output 102A but the switch mode process remains enabled.

In a step L, the output 102 can be loaded. The signal on node 122 does not decline to a level where a skip mode can be initiated. The output of the regulation comparator remains in the high state to continue the switch mode process. The drive signal in the high state keeps the switch mode power supply controller in the regulation mode. Energy can be transferred the switch mode process to the output 102A to maintain the output to the requested regulation level while the drive signal remains in the high state.

Figure 7:
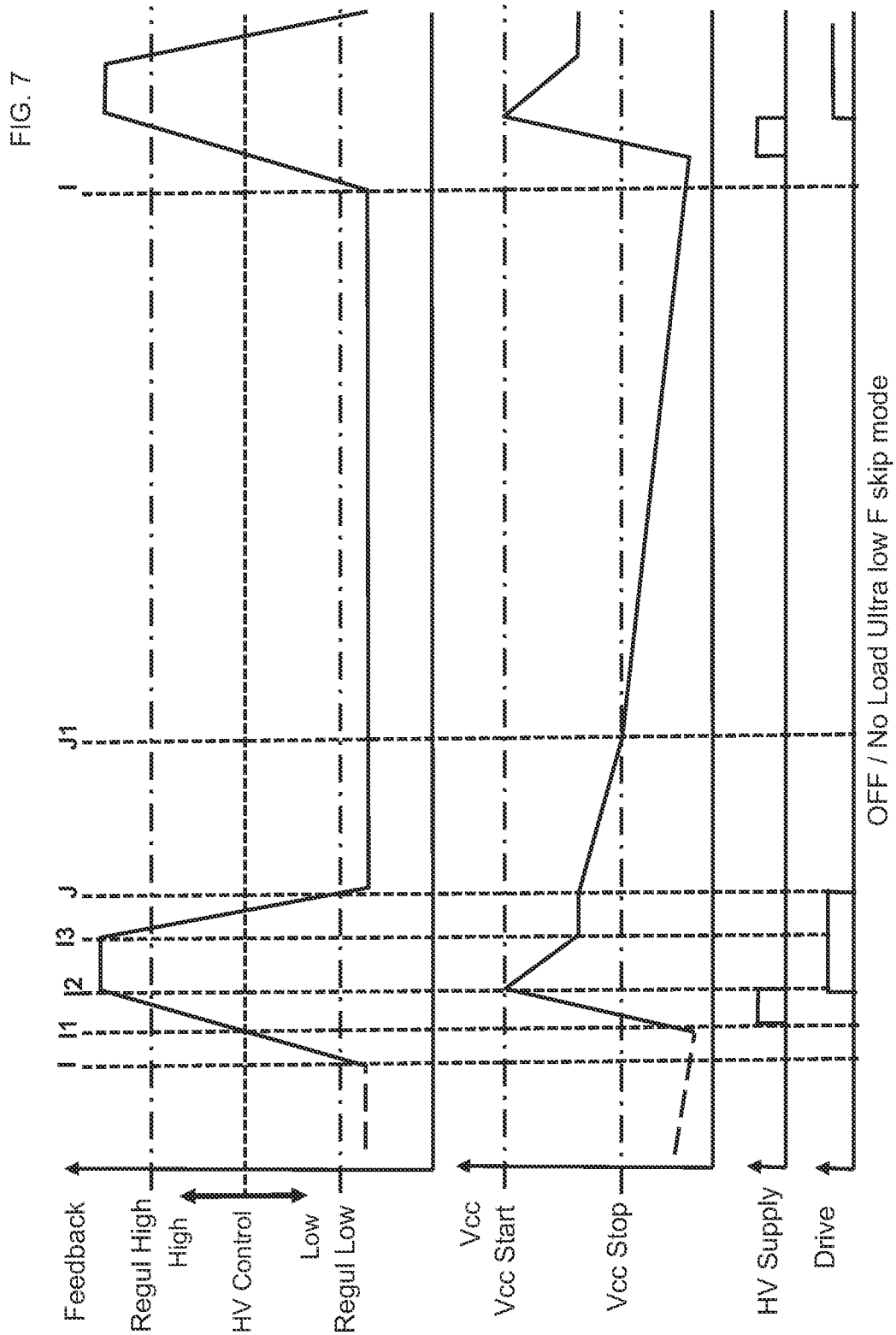
FIG. 7 illustrates a portion of signals that can occur during a portion of the operation of a portion of a system of an embodiment of the present invention.

FIG. 7 is a timing diagram illustrating the switch mode power supply controller in the off-mode implemented through a feedback pin or feedback node in accordance with an embodiment. FIGS. 1 and 2 can be referred to when describing circuit components. Prior to the step I, the FC circuit 118 can be in the off-mode. The outputs of start comparator 216 and regulation comparator 228 can both be in the low state. The voltage Vout at the output 102A of the power supply 100 falls below the minimum regulated voltage in the off-mode. In the step I, a start mode can be initiated when the optical feedback collapses due to the voltage Vout at output 102A or when the signal enabling transistor 132 to hold node 122 ground is removed. In either case, the start mode is initiated because no signal can be provided to node 122. The voltage on node 122 (e.g. feedback pin or feedback node) begins to rise by the current provided by current source 202 driving the high impedance of node 122.

In a step I1, the voltage at node 122 rises to a voltage that breaks down zener diode 208 thereby making it conductive. The output of start comparator 216 transitions from the low state to a high state when zener diode 208 is conductive. The voltage at node 122 when zener diode 208 becomes conductive is shown as the voltage HV control. The output of start comparator 216 in the high state can be coupled the current source 204 to the Vcc supply (e.g, node 102) of power supply 100. The current from current source 204 rapidly increases the voltage Vcc at node 102. Optical feedback corresponding to the voltage Vcc enables the transistor 132 for conducting a current. The enabled transistor 132 sinks current from current source 202 and reduces the voltage at node 122. The voltage at node 122 can be reduced by the optical feedback to make zener diode 208 non-conductive. The output of the start comparator 216 transitions from the high state to the low state when zener diode 208 can be non-conductive. The low state at the output of the start comparator 216 decan be coupled the current source 204 from the supply 102 when the output 102 can be at the voltage Vcc Start.

In a step I2, the voltage at node 122 in combination with the supply 102 at Vcc Start produces a transition from the low state to a high state at the output of regulation comparator 228. The drive signal in high state enables the switch mode power supply controller to transfer energy via the transformer 112. Thus, the power supply 100 changes from the start mode to the regulation mode. In one embodiment, the optical feedback can be clamped high until the regulation starts to be activated on the secondary side of the power supply 100. In general, increasing optical feedback reduces the rate of energy transfer over a period of time. The voltage Vcc decreases at output 102 as little or no energy transfer occurs to output 102A during the step I2.

In step I3, the voltage Vcc decreases from Vcc start to regulated level corresponding to level of output voltage on 102A Lowering the optical feedback increases the rate of energy transfer over a period of time. Energy can be transferred by the switch mode process to the output 102A at a rate that increases or prevents both Vout and the voltage Vcc from decreasing further. The energy transfer can be provided from the secondary side of transformer 112.

In the step J, the optical feedback continues to go down. In the example, the feedback level goes less than a skip level. The secondary no-load detection circuit in condition and status circuit 130 (FIG. 2) detects a no-load condition during step J. The condition and status circuit 130 in the off-mode enables transistor 132 to drive the node 122 at ground. The power supply 100 changes from the regulation mode to the off-mode. The low feedback level causes the output of the regulation comparator to transition from the high state to the low state. The drive signal in the low state disables the switch mode power supply controller from transferring energy to the output 102A of power supply 100. The voltage Vcc will continue to fall as no energy can be transferred to mitigate charge loss. As shown, the voltage Vcc decreases to the voltage Vcc Stop from step J to step J1.

In step J1, the condition and status circuit 130 maintains the node 122 in the off-mode such that the voltage Vcc at the supply 102 continues to fall below the voltage Vcc Stop. The voltage Vcc continues to fall until the optical feedback collapses due to the voltage Vout at output 102A or when the signal enabling transistor 132 to hold node 122 ground is removed. In the example, the transistor 132 can be turned off when the optical feedback collapses. The voltage at node 122 rises to change the power supply 100 from the off-mode to the start mode indicated again by the step I. The process continues again as discussed above.

Figure 8:
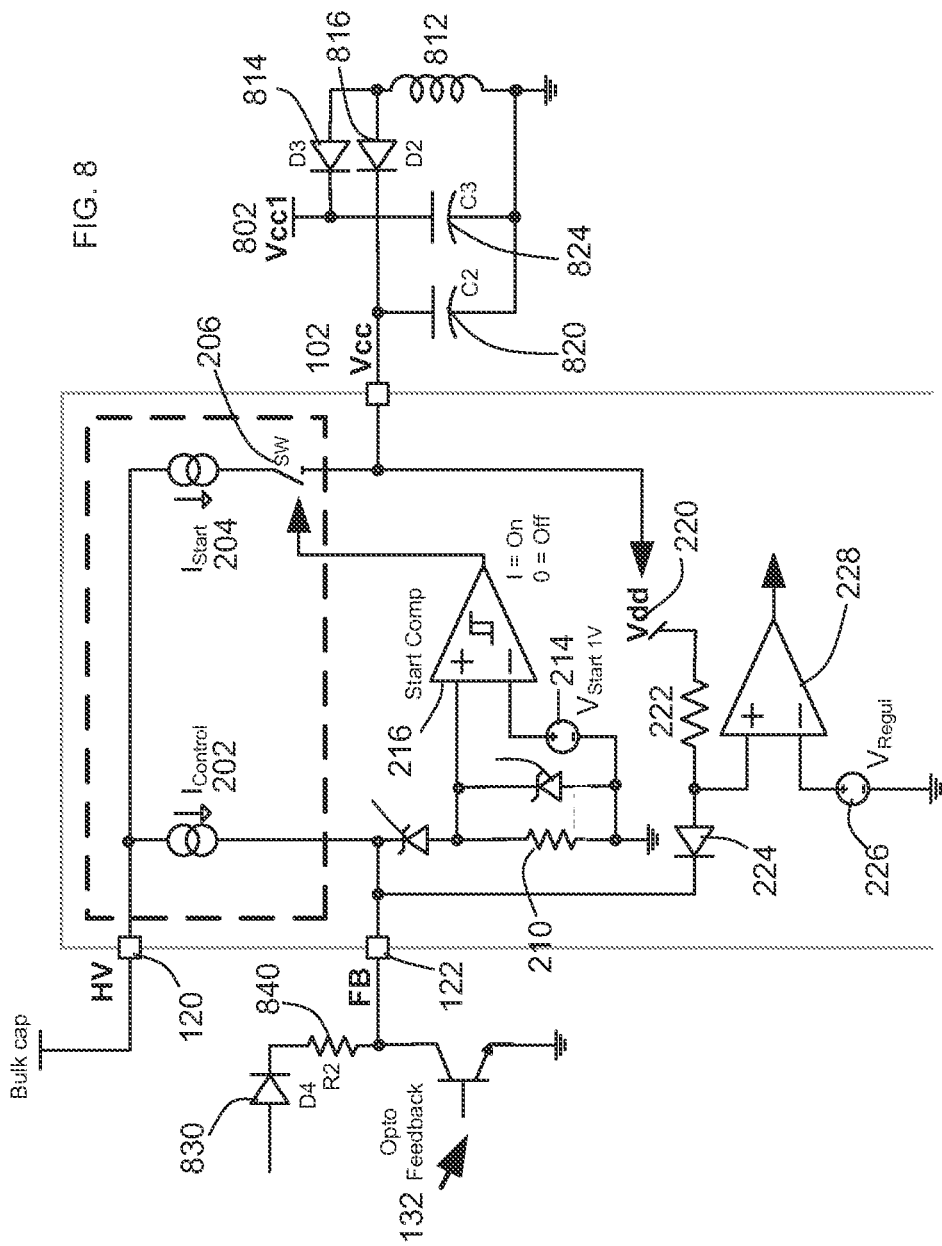
FIG. 8 schematically illustrates an embodiment of a portion of a circuit that can be a portion of a system in accordance with an embodiment of the present invention.

FIG. 8 is a schematic diagram of the FC circuit 118 including an external pull-up in accordance with an embodiment. A diode 814 can have an anode coupled to the secondary transformer winding and a cathode to a storage capacitor 824 can have a first terminal coupled to the cathode of diode 814 and a second terminal coupled to ground. A voltage Vcc1 corresponds to the voltage on the cathode of diode 814. In one embodiment, the storage capacitor 824 can have a capacitance less than the storage capacitor 116. The voltage Vcc1 corresponds to the voltage Vcc as both are generated by the auxiliary winding of the switch mode power supply.

The external pull-up comprises a diode 830 and resistor 840. The diode 830 can have an anode coupled to the cathode of the diode 814 and a cathode to the resistance R840. The resistor 840 includes a first terminal coupled to the cathode of diode 830 and a second terminal coupled to the node 122. A current is conducted by the diode 830 when the voltage Vcc1 is more than a forward diode voltage drop above the voltage at node 122. Thus, current to raise the voltage at node 122 comprises the current from current source 202 and the current provided through the external pull-up. The external pull-up coupled to the feedback pin or feedback node (e.g. node 122) provides several benefits. First, there is reduced pull-up when the power supply 100 is in off-mode. Second, the resistor 840 increases the pull-up in the ON mode but the amount of charge is limited during starting phase while the cap is discharged. Third, storage capacitor 824 including a low capacitance value provides reduced pull-up in the low frequency skip mode as cap is discharged in between 2 cycles. Finally, requirements for the optically generated current by transistor 132 and secondary drive current can be reduced. These benefits result in improved skip or standby mode. Power consumption can be reduced in both the standby mode and the off-mode thereby improving the long-term efficiency of the power supply 100. A further improvement can be incorporated by adding an internal pull-up switch controlled by the skip mode control.

Figure 9:
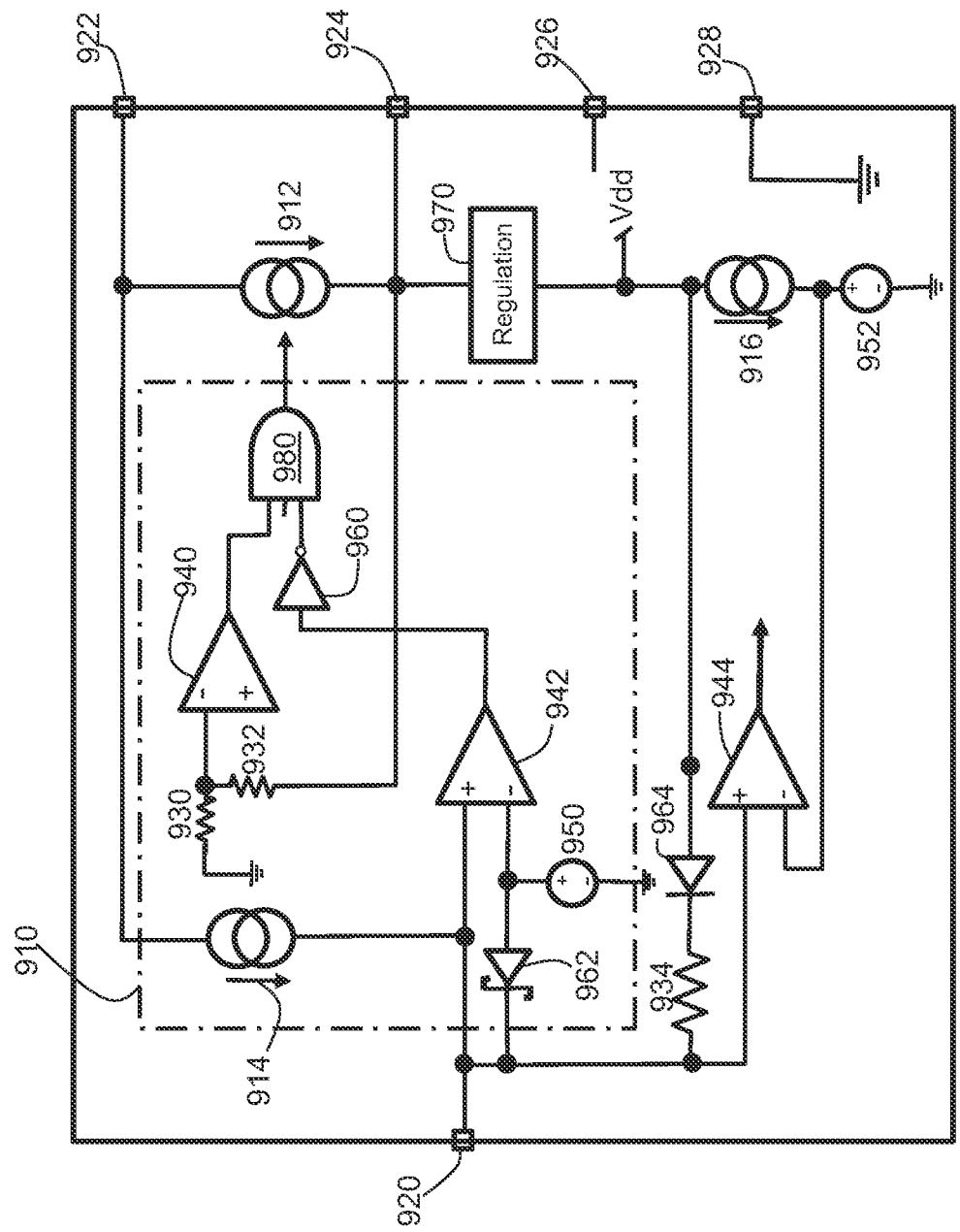
FIG. 9 schematically illustrates an embodiment of a portion of an integrated circuit that can be a portion of a system in accordance with an embodiment of the present invention.

FIG. 9 schematically illustrates an embodiment of a portion of an integrated circuit including an off-mode detection circuit 910. The off-mode detection circuit 910 includes at least two comparators 940 and 942, several resistors 930, 932, diode 962, current source 914, AND gate 980, inverter 960, and reference voltage 950. The feedback signal enters through pin 920 and if the feedback signal is high then HV source via pin 922 supplies through current source 912 the Vcc when collapsing from a transformer. In the IC illustrated, Vcc is provided through pin 924, the driver signal through pin 926, and the IC is grounded via pin 928. A further current source 912 is connected to a regulation module 970 which is operatively connected to a reference Vdd, another current source 916 and diode 964. Diode 964 is operatively connected to a resistor 934 which is connected to node (pin) 920 and to the positive terminal of comparator 944. The opposite terminal of current source 916 is connected to the negative terminal of comparator 944 and voltage reference 952. The comparator 944 result is connected operatively to the SMPS control part to drive the Power Switch through pin 926.

Figure 10:
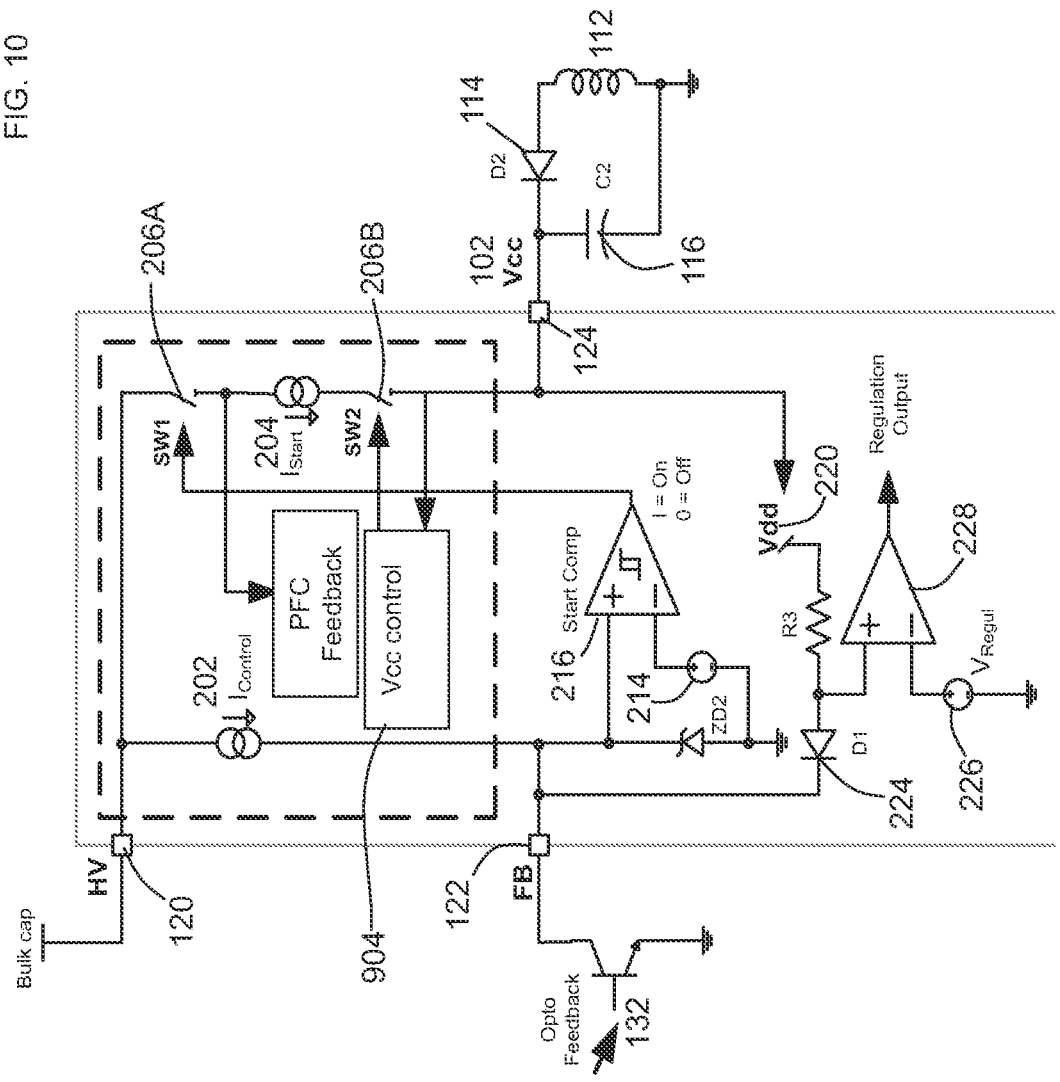
FIG. 10 schematically illustrates an embodiment of a portion of a circuit that can be a portion of a system in accordance with an embodiment of the present invention.
Figure 11:
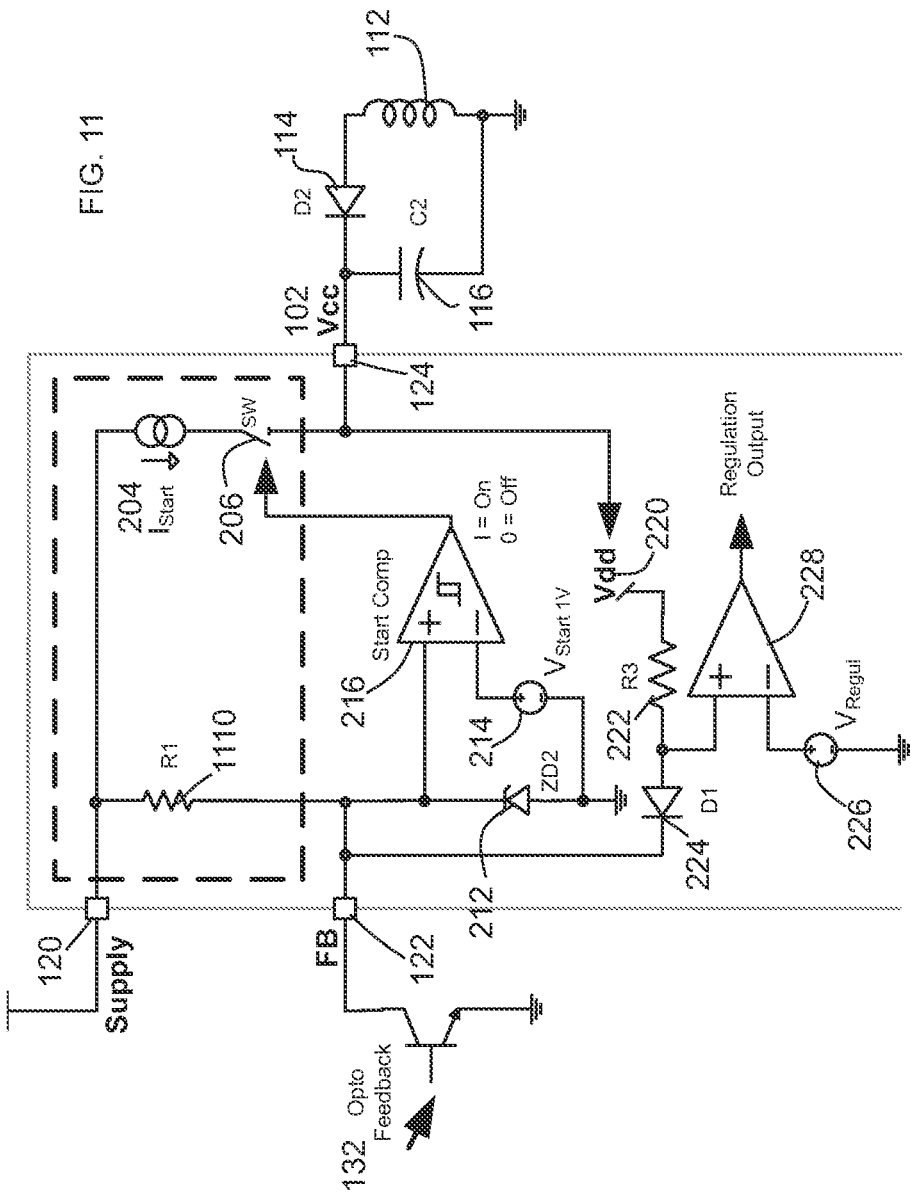
FIG. 11 schematically illustrates an embodiment of a portion of a circuit that can be a portion of a system in accordance with an embodiment of the present invention.

FIG. 10 is a schematic diagram of the FC circuit 118 which can provide power factor correction feedback in accordance with an embodiment. For brevity, only the added circuitry to FC circuit 118 will be discussed. A path for coupling current source 204 between the node 120 and node 124 can be controlled by two switches. The added switch allows the HV voltage to be used as power factor correction feedback. The two switches also provide low OFF mode consumption by disconnection of current source 204 in standby mode or off mode. Switch 206A can have the first terminal coupled to the node 120 and the control terminal coupled to the output of the start comparator 216. The current source 204 can have the first terminal coupled to the second terminal of the switch 206A. Operation of the switch 206B operates similarly to that described hereinabove by the start comparator 216 with regards to switch 206B. A switch 206A can be added to the FC circuit 118. The switch 206B can have a first terminal coupled to the second terminal of the current source 204, a control terminal coupled to a first terminal of Vcc control circuit 904 and a second terminal coupled to the node 124. The Vcc control circuit 904 can have a second terminal coupled to the node 124.

The switch 206B can be closed in start mode when little or no signal is provided to node 122 thereby allowing the voltage on node 122 to rise to a level that transitions the output of start comparator 216 from the low state to the high state. Closing switch 206B couples the current source 204 for receiving the voltage HV at node 120. Furthermore, the voltage HV at node 120 can be provided as power factor correction feedback to the switch mode power supply controller when the switch 206A is closed. Conversely, the switch 206B can be open in the skip mode and the off mode when the voltage on node 122 falls below the reference voltage 214. Including switch 206B which decouples the current source 204 from the node 124. In one embodiment, the reference voltage 214 can be reduced to a lower level than the application described hereinabove. Reducing the reference voltage 214 keeps the switch 206B closed during the start mode.

The Vcc control circuit 904 controls the operation of switch 206B. The Vcc control circuit 904 detects or senses the voltage Vcc at node 124. The detection circuitry in Vcc control circuit 904 provides a control signal to supply 102 that corresponds to the voltage Vcc. The Vcc control circuit 904 provides a control signal that opens switch 206B when the voltage Vcc at node 124 can be greater than a predetermined value thereby decoupling current source 204 from node 124. The Vcc control circuit 904 provides a control signal that closes switch 206B when energy can be requested. For example, energy can be requested when the power supply 100 can be first turned on or a transition from off-mode to the start mode.

Figure 12:
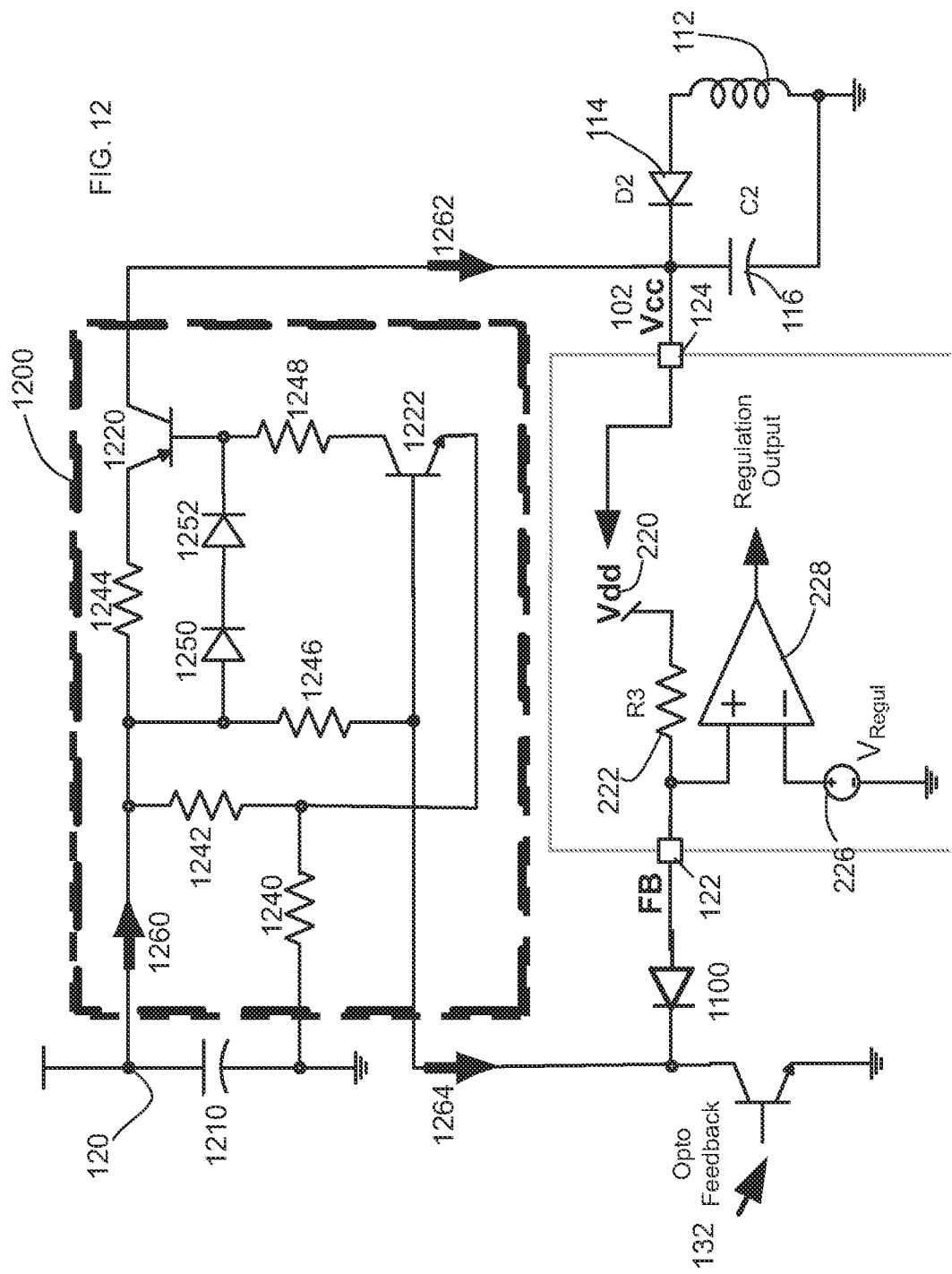
FIG. 12 schematically illustrates an embodiment of a portion of a circuit that can be a portion of a system in accordance with an embodiment of the present invention.

FIG. 12 is a schematic diagram of the FC circuit 118 with an external voltage supply in accordance with an embodiment. An external voltage supply can be coupled to node 120. In one embodiment, the external voltage supply can be a lower voltage than that generated by the switch mode power supply 100 in previous solutions explained. In the example, including the external voltage supply allows an embedded off mode to be implemented. A start control can also be combined with feedback. The lower voltage of external voltage supply at node 120 allows a simplification of circuitry and a lower component count of the FC circuit 118. In particular, a resistor 1244 replaces current source 202. The resistor 1242 also eliminates the need for resistor 210 and zener diode 208 that support high voltage operation. The resistor 1242 can have a first terminal coupled to the node 120 and a second terminal coupled to the node 122. The FC circuit 118 operates similarly in start mode. No signal can be coupled to node 122 from transistor 132 allowing the resistor 1242 to raise the voltage on node 122.

The external discrete off mode circuit 1200 can have a first terminal coupled to the collector of transistor 132 and a second terminal coupled to node 124. The discrete off mode circuit 1200 comprises resistors 1240, 1242, 1244, 1246, and 1248, pnp transistor 1220, npn transistor 1222, diode 1250, and diode 1252. The resistors 1240 and 1106 form a resistor divider for setting a voltage at the emitter of npn transistor 1222. The resistor 1242 can have a first terminal coupled to the node 120 and a second terminal. The resistor 1240 can have a first terminal coupled to the second terminal of resistor 1242 and a second terminal coupled to ground. Base current to npn transistor 1222 can be provided through resistor 1246. The resistor 1246 can have a first terminal coupled to the node 120 and a second terminal coupled to the base of pnp transistor 1222. The resistor 1244 can be an emitter degeneration resistor for pnp transistor 1220. The resistor 1244 can have a first terminal coupled to node 120 and a second terminal. The pnp transistor 1220 provides current to charge the storage capacitor 116 and raise the voltage Vcc on node 102 when a start mode can be initiated. The current output by the pnp transistor 1220 corresponds to the voltage across resistor 1244. The voltage across resistor 1244 and the base-emitter junction of pnp transistor 1220 can be equal to the forward voltage drop of diodes 1250 and 1252. The diodes 1250 and 1252 are in series. The pnp transistor 1220 can have an emitter coupled to the second terminal of resistor 1244, a base, and a collector coupled to the second terminal of circuit 1200. The diode 1250 can have an anode coupled to the node 120 and a cathode. The diode 1252 can have an anode coupled to the cathode of diode 1250 and a cathode coupled to the base of pnp transistor 1220. The npn transistor 1222 sinks the base current of pnp transistor 1220 when enabled in the start mode. The resistor 1112 can have a first terminal coupled to the base of pnp transistor 1220 and a second terminal. The npn transistor 1222 can have a collector coupled to the second terminal of resistor 1112, the base coupled to the first terminal of circuit 1200, and the emitter coupled to the second terminal of resistor 1240. An external diode 1100 replaces diode 224 coupled to regulation comparator 228. The external diode 1100 isolates the circuit 1200 from the node 122 of FC circuit 118. The external diode 1100 can have an anode coupled to node 122 and a cathode coupled to the first terminal of circuit 1200. In the start mode, the output of the regulation comparator 228 is in the low state and the transistor 132 can be off. The voltage on the base of npn transistor 1222 rises by current provide through resistor 1246. The npn transistor 1222 enabled provides base current to the pnp transistor 1220 thereby enabling the device. The circuit 1200 provides a current from the second terminal to the Vcc supply 102 of the power supply 100. Conversely, transistor 132 when enabled such as in off-mode, skip mode, or regulation mode sinks a current that pulls the voltage at the base of npn transistor 1222 to a voltage that turns the device off. No base current can be provided to the pnp transistor 1220 when the npn transistor 1222 is off such that no current can be provided to output 102 by the circuit 1200. The regulation comparator 228 is in a low state or high state depending on the mode of operation as disclosed above. The external discrete off mode circuit 1200 keeps Vcc used for an X2 capacitors discharge function even in off mode. The internal voltage Vdd can be switched off during the off mode to reduce power consumption. The off mode can be implemented when the feedback corresponding to transistor 132 is at a low level thereby improving long term power efficiency of the power supply by allowing the voltage Vcc to fall below Vcc Stop.

Figure 13:
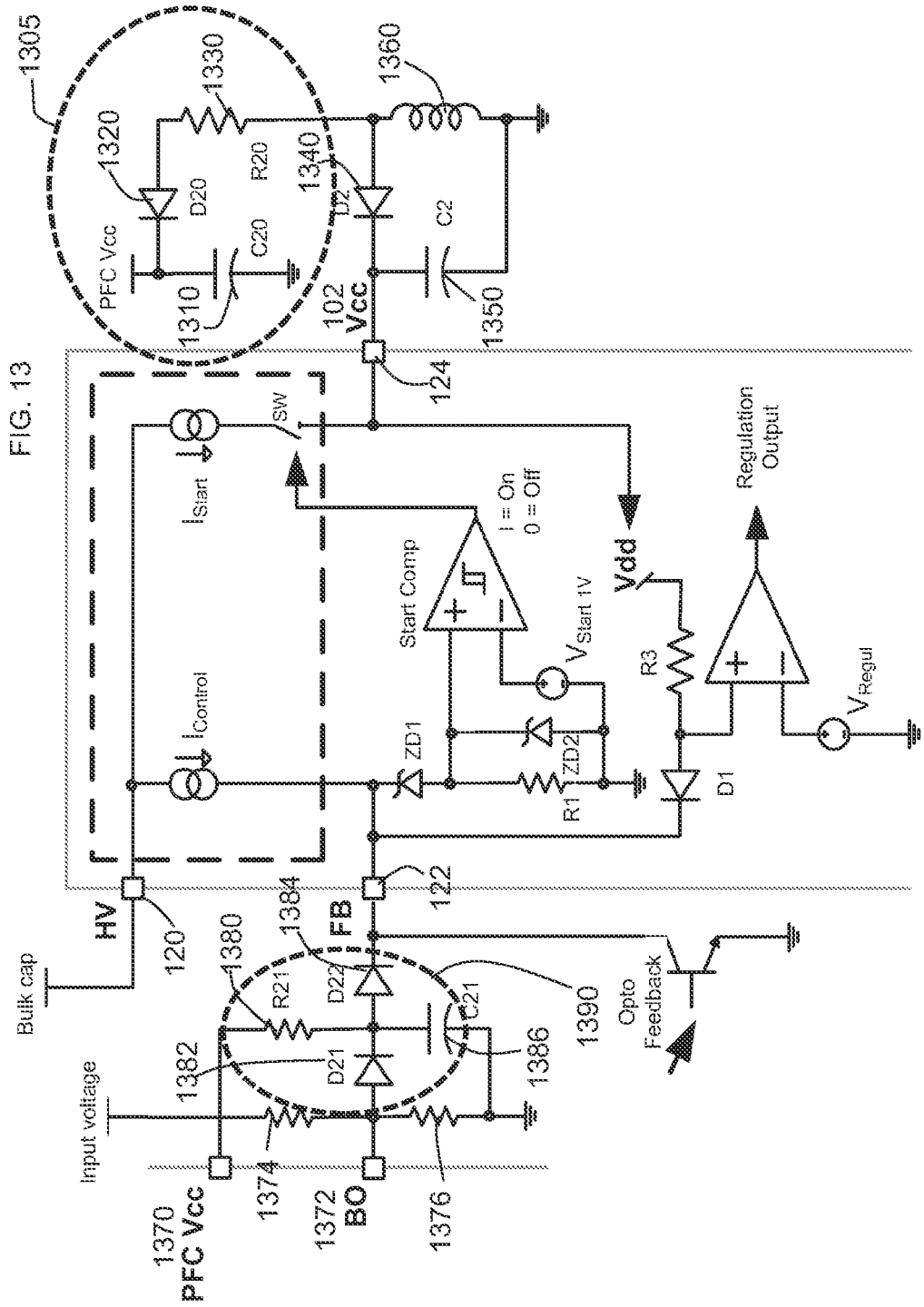
FIG. 13 schematically illustrates an embodiment of a portion of a system in accordance with an embodiment of the present invention.
Figure 14:
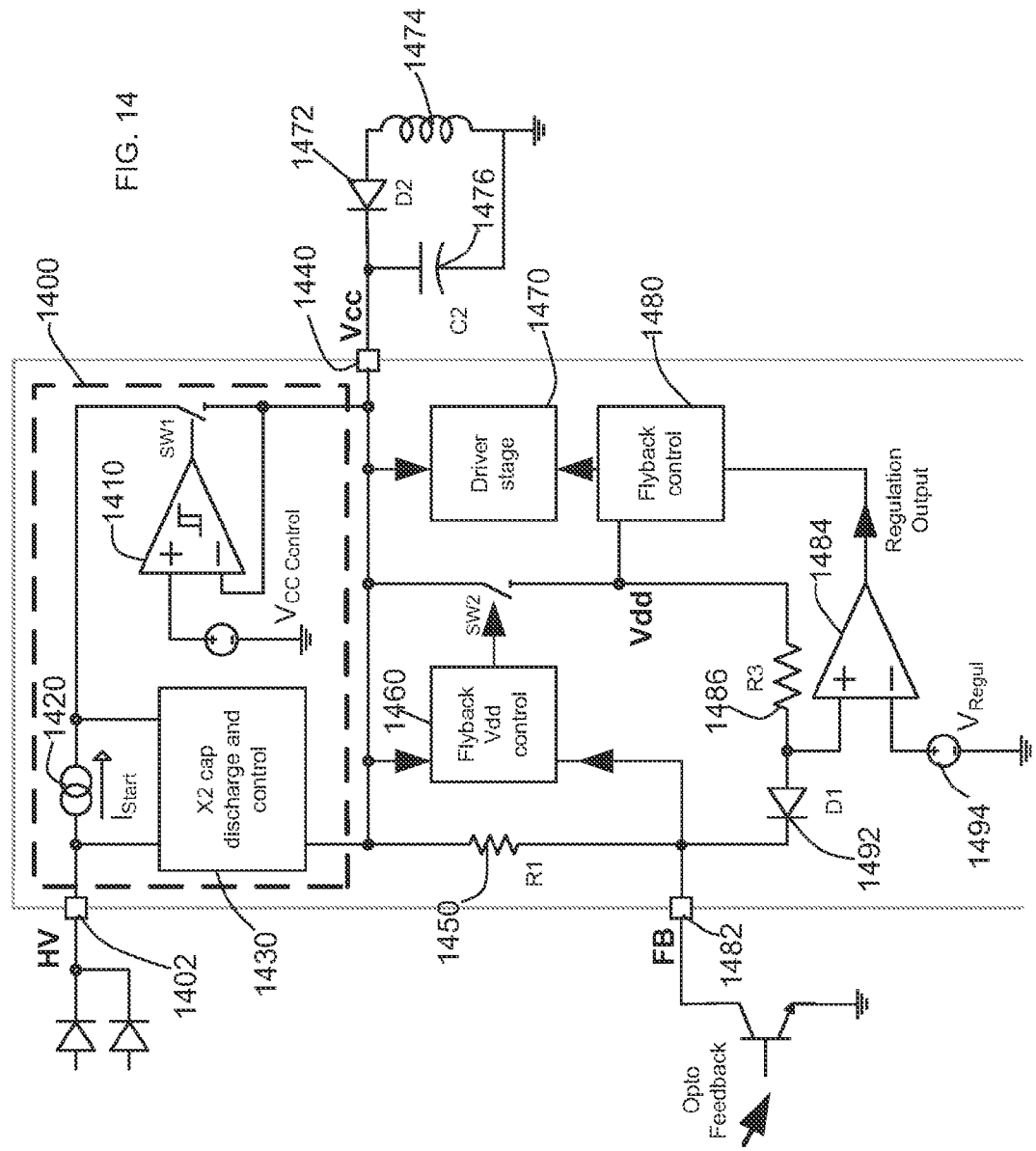
FIG. 14 schematically illustrates an embodiment of a portion of a system in accordance with an embodiment of the present invention.
Figure 15:
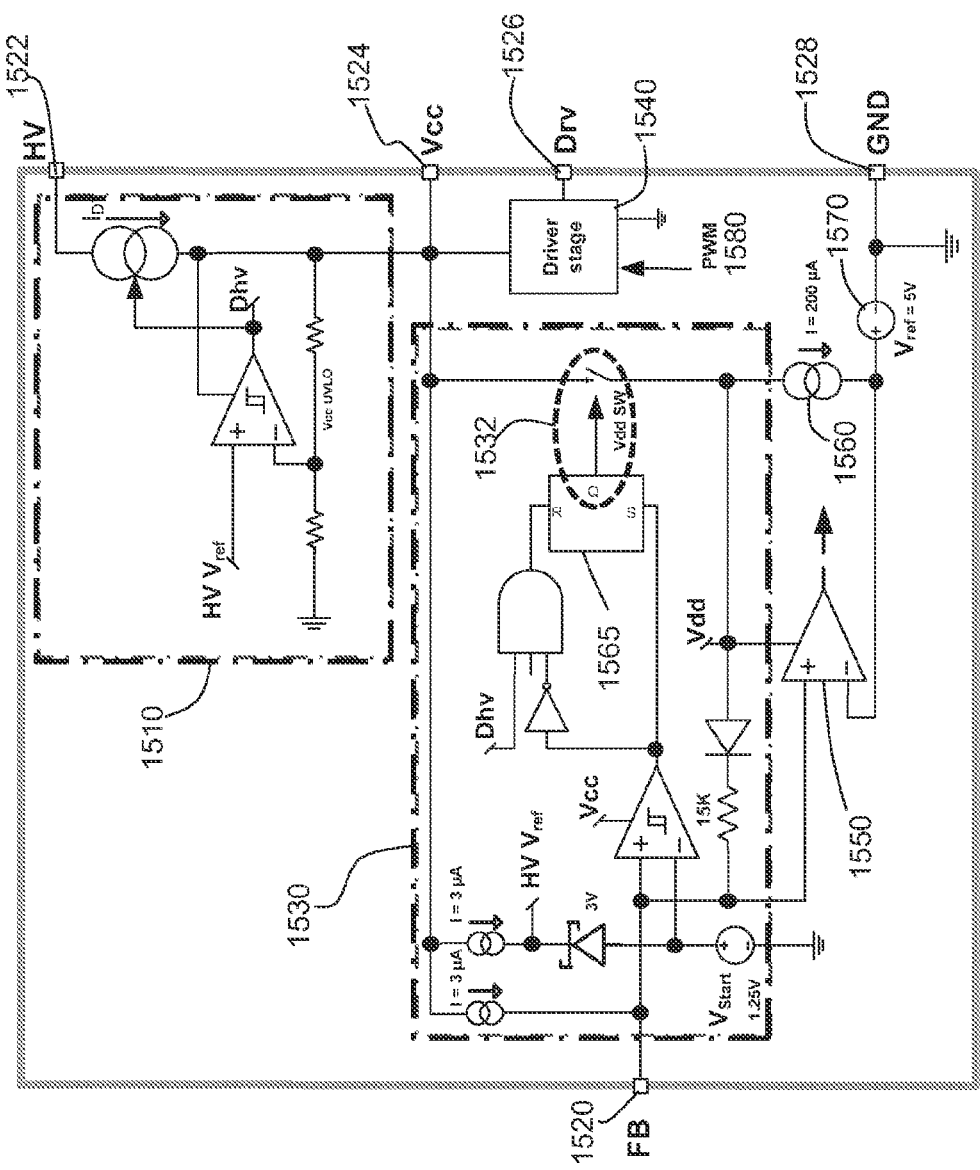
FIG. 15 schematically illustrates an embodiment of a portion of an integrated circuit that can be a portion of a system in accordance with an embodiment of the present invention.
Figure 16:
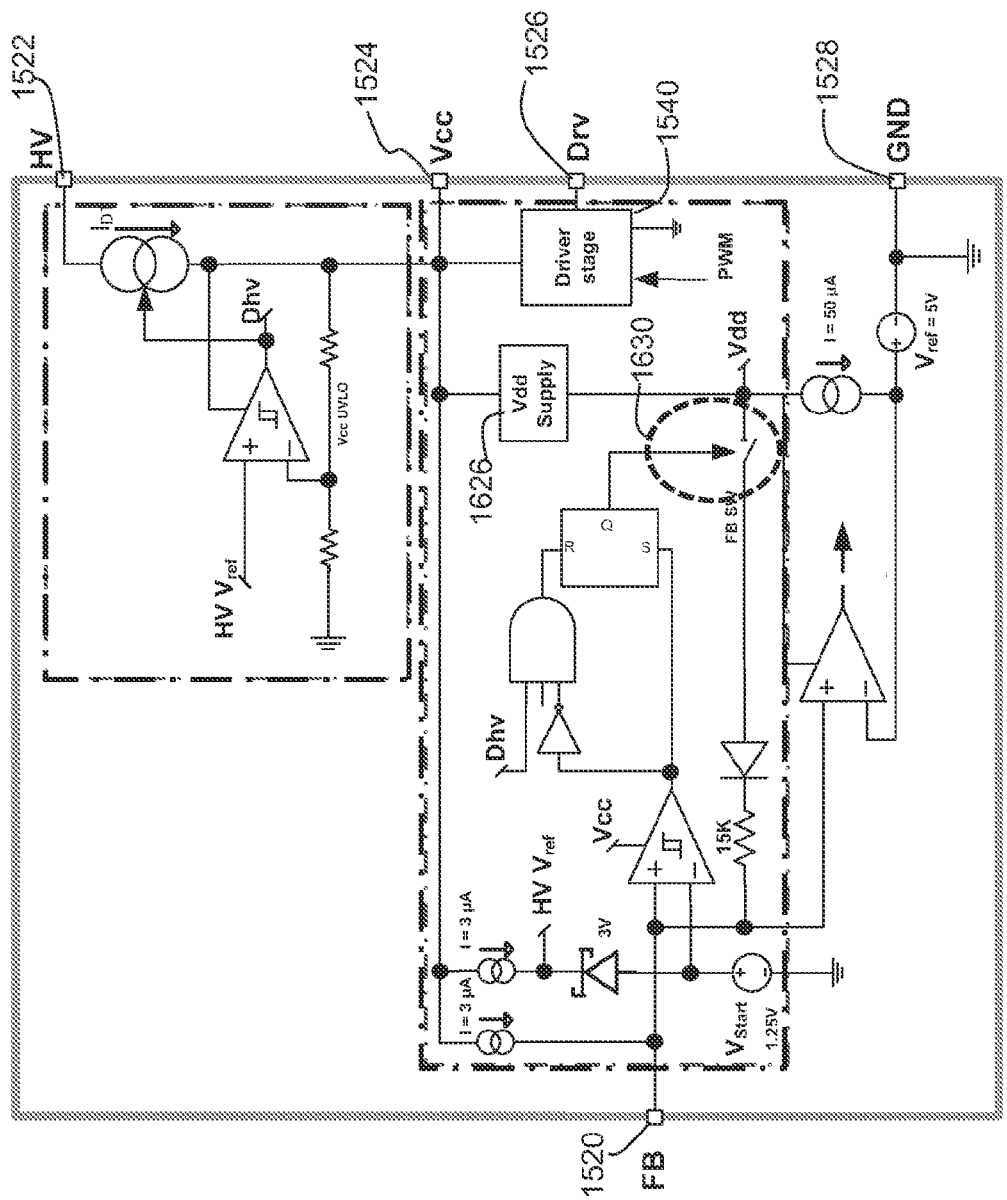
FIG. 16 schematically illustrates an embodiment of a portion of an integrated circuit that can be a portion of a system in accordance with an embodiment of the present invention.
Figure 17:
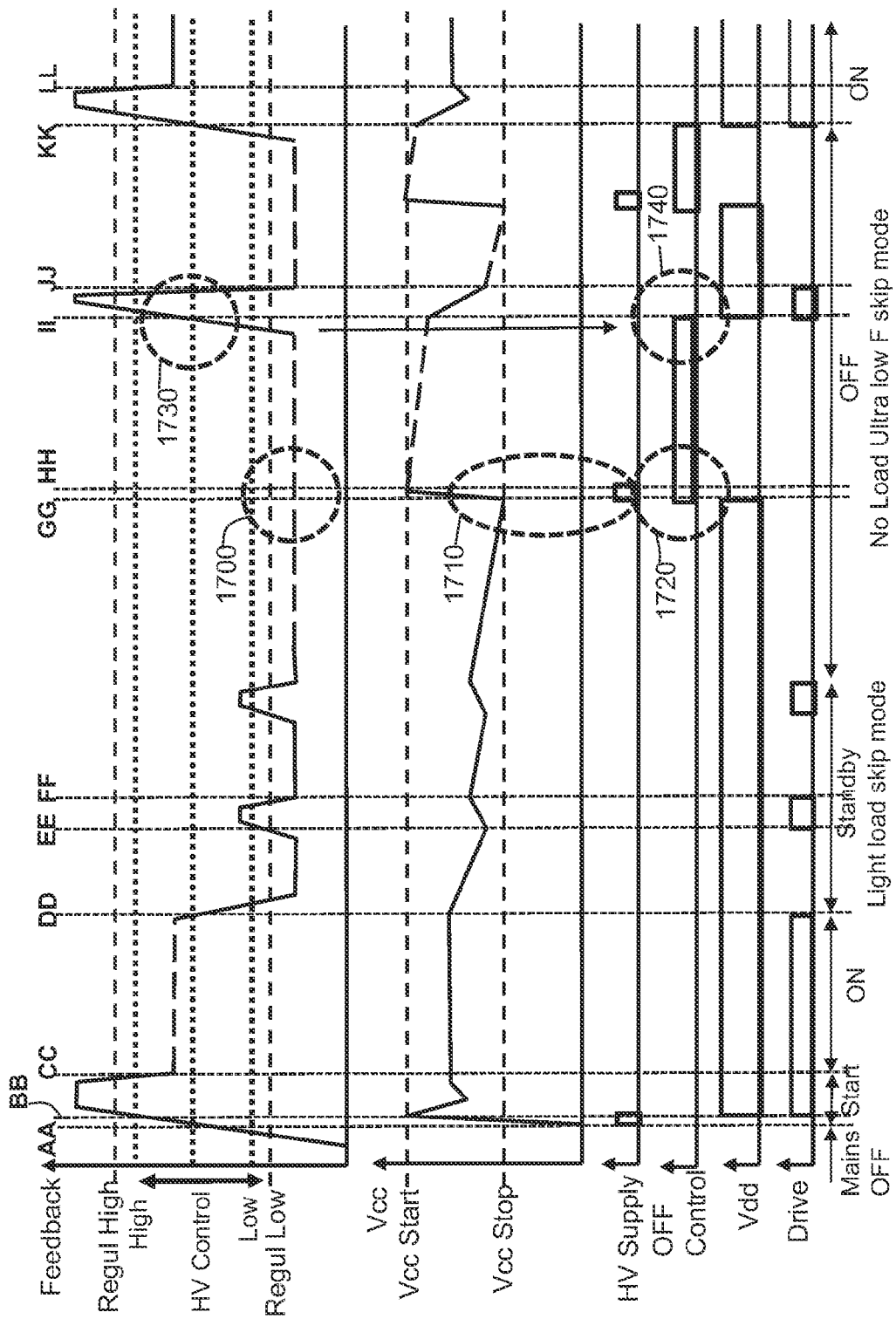
FIG. 17 illustrates a portion of signals that can occur during a portion of the operation of a portion of a system of an embodiment of the present invention.

FIG. 13 schematically illustrates an embodiment of a portion of a system in accordance with an embodiment of the present invention. Illustrated is a schematic diagram of an OFF control circuit which is configured to switch OFF a PFC IC through. FIG. 14 schematically illustrates an embodiment of a portion of a system in accordance with an embodiment of the present invention;

FIG. 15 schematically illustrates an embodiment of a portion of an integrated circuit that can be a portion of a system in accordance with an embodiment of the present invention;

FIG. 16 schematically illustrates an embodiment of a portion of an integrated circuit that can be a portion of a system in accordance with an embodiment of the present invention; and FIG. 17 illustrates a portion of the operation of a portion of a system of an embodiment. Various operations at specifics steps will be discussed. At step AA the HV power supply is triggered by the feedback signal of positive slope in time passing a value equal to about HV Control. The HV Supply is ON until Vcc=Vcc start at which time a drive signal is started at step BB and the system enters start-mode. At step BB Vcc=Vcc start, and the HV Supply is switch OFF and IC started with the initiation of a drive signal, while Vcc drops below Vcc Start. By step CC, ON mode is initiated by a constant feedback signal (FB). At step CC the system is in ON mode, FB>skip level, Vcc is regulated from the transformer, and the HV power supply is OFF while Vcc>Vcc stop. In the light load skip mode initiation at step DD there exists a light load, FB<skip level, and Vcc is dropping but staying above Vcc stop. When the feedback signal exceeds the skip level a drive signal is initiated that increases Vcc with energy from a transformer, this is illustrated in step EE. When the feedback signal drops below the skip value then the drive signal is stopped, and Vcc starts to drop again, as illustrated in step FF. As long as a light load is indicated Vcc continues to drop. If no load is detected, such as when the feedback signal is below a lower threshold 1700 (e.g., skip level), then Vcc continues to drop without any attempt to regulate. When Vcc drops below 1710 a lower threshold level such as Vcc Stop then at least one embodiment initiates an off control signal 1720 that provides power from the HV Supply that increases 1710 Vcc above Vcc Stop so that Vcc does not collapse. At step HH, when Vcc is equal to or exceeds Vcc Start the HV Supply is stopped, allowing Vcc to drop. If the feedback signal is still less than a skip value the system remains in the off mode and Vcc gradually decreases. If the secondary voltage is too low the Opto collapse or OFF signal disappears (1740), asking for restart and ending the OFF mode. In this case the FB signal is going up again thanks to Vcc pull-up. When FB>HV Control (1730), OFF control is going down and Vdd Supply is switched ON again. FB is going up to clamp until the start of a regulation-mode activated from secondary side. As illustrated at step JJ driven by the secondary regulation, FB is going down <skip level, Vcc is going down as Drive is OFF.

After a time, Secondary No load detection provides an OFF signal which keeps the FB<skip level. HV Supply will be started when necessary to keep Vcc above Vcc Stop. When the slope of the feedback signal is positive in time and the feedback signal exceeds HV Control the OFF signal is stopped, the Vdd signal is started and is the drive signal, indicating the onset of the ON mode, as illustrated in step KK. If the feedback signal has dropped then remains stable above HV Control then the feedback signal is greater than the skip value and Vcc is directly supplied from transformer, as illustrated in step LL A method of implementing an off mode, regulation mode, and start mode in a switch mode power supply through a feedback pin or feedback node of a switch mode power supply controller is disclosed herein in one or more embodiments. The steps disclosed can be performed in any order or combination. In a first step, a no-load condition can be detected. In one embodiment, a no-load condition is where an output of the power supply is not loaded by a device requiring power. Examples of a no-load condition are a device coupled to the output that is turned off, the device in sleep-mode, the device in energy saving mode, or no device coupled to the output. In one embodiment, a circuit coupled to the output of the power supply detects the no-load condition. In a second step, an off mode signal is provided to the feedback pin or the feedback node. In the embodiment, disclosed hereinabove, the off mode signal can be coupled to base of a transistor that pulls the feedback pin or the feedback node to a low state or ground.

The low state at the feedback pin or feedback node can be coupled to positive input a start comparator. In a third step, a low state can be generated at an output of the start comparator when the off mode signal can be provided. A negative voltage differential can be created from positive to negative input of the start comparator resulting in the low state at the output of the start comparator. The low state at the output of the start comparator decoupled a current source from the output of the power supply. Thus, no start current is provided to the output of the power supply to raise the voltage thereon.

The low state of the feedback pin or feedback node also can be coupled to a positive input of a regulation comparator. In a fourth step, a low state can be generated at an output of the regulation comparator when the off mode signal is provided. A negative voltage differential can be created from the positive to negative input of the regulation comparator resulting in the low state at the output of the regulation comparator. The low state at the output of the regulation comparator disables the switch mode power supply controller. In other words, the low state at the output of the regulation comparator disables the switch mode process from transferring energy to the output of the switch mode power supply. Thus, no energy transfer occurs due to the switch mode process of the switch mode power supply. Providing no charge to the output of the power supply will result in the voltage falling below the minimum regulated voltage.

In a fifth step, the off mode signal is removed from the feedback pin or the feedback node when the voltage at the output of the power supply falls below an off mode output voltage. In general, the voltage at the output is prevented from falling below the off mode output voltage. The off mode output voltage can be below the minimum voltage when the switch mode power supply is in regulation mode. The off mode increases the power efficiency by extending the time between energy transfers when power or regulated voltage is not needed.

In a sixth step, a high state can be generated at the output of the start comparator. In one embodiment, removing the off mode signal results in no signal being provided to the feedback pin or feedback node. The no-signal at the feedback pin or feedback node results in a high state being generated at the feedback pin or feedback node. In the embodiment, the transistor that can be coupled to the feedback pin or the feedback node can be turned off thereby generating no-signal. A current source coupled to the feedback pin or feedback node generates a high state thereon. A positive voltage differential is created from the positive to negative input of the start comparator resulting in the high state at the output of the start comparator.

In a seventh step, the high state at the output of the start comparator enables a current source to be coupled to the output of the switch mode power supply. The voltage at the output of the switch mode power supply will rise due to the current supplied by the current source. In the example, the regulation comparator does not change state from the low state. The high voltage at the feedback pin or feedback node and the output voltage of the switch mode power supply below the minimum regulated voltage maintains a negative voltage differential from the positive to negative input of the regulation comparator.

In an eighth step, a regulation mode signal is provided to the feedback pin or the feedback node as the voltage rises at the output of the power supply due to the current provided by the current source in the start mode. In one embodiment, the voltage at the output of the power supply can be rapidly charged by the current source. The regulation mode signal can be a feedback signal that corresponds to the voltage at the output of the power supply. More specifically, a signal corresponding to the voltage at the output of the power supply can be optically generated and coupled to the base of the transistor including the collector coupled to the feedback pin or the feedback node. The signal provided to the base of the transistor generates a collector current that can be the regulation mode signal. As mentioned previously, the regulation mode signal will vary as the voltage at the output of the power supply varies.

In a ninth step, a low state at the output of the start comparator can be generated when the regulation mode signal can be provided to the feedback pin or feedback node. The regulation mode signal reduces the voltage at the feedback pin or feedback node such that a negative voltage differential can be created from the positive to negative input of the start comparator. The low state at the output of the start comparator can decouple the current source from the output of the power supply thereby preventing a further increase in voltage. The current source can be stopped or prevented from providing current to the output of the power supply. In one embodiment, the current source can be decoupled from the output of the power supply at approximately or before the voltage reaches the maximum regulated voltage.

In a tenth step, a high state at the output of the regulation comparator can be generated. In the example, two conditions exist in the regulation mode. First, the voltage at the output of the power supply can be greater than the minimum regulated voltage. Second, the voltage at the feedback pin or feedback node can have transitioned from the high state in start mode to a lower state due to the regulation mode signal. The two conditions combine to generate a positive voltage differential from the positive to negative input of the regulation comparator. The positive voltage differential causes the output to transition from the low state to a high state. The high state at the output of the regulation comparator enables the switch mode power supply controller.

In an eleventh step, energy can be transferred via the switch mode process to maintain the voltage at the output of the power supply between the minimum and maximum regulated voltage. The switch mode process monitors the voltage at the output of the power supply and maintains the voltage between the minimum and maximum regulated voltages. The frequency and amount of energy transfer can vary as a function of loading on the output of the power supply. As disclosed herein, the transition between different operating modes can be accomplished without adding pins to a switch mode power supply controller. The off-mode can then be implemented into existing designs without printed circuit board redesigns or major part changes thereby allowing rapid adoption of more power efficient power supplies.

In at least one embodiment despite that $V_{cc}$ is lower than requested level in OFF mode no energy is transferred by the transformer to supply the IC, where the HV Source generator will not be activated when Feedback/ON/OFF control is below HV Control level which is above the Feedback skip level.

While embodiments have been described with reference to particular embodiments, those skilled in the art will recognize that many changes may be made thereto without departing from the spirit and scope of embodiments. Each of these embodiments and obvious variations thereof can be contemplated as falling within the spirit and scope of the invention.

What can be claimed is:

1. A semiconductor voltage controller comprising:
   a start-mode circuit associated with a start-mode;
   an off-mode circuit associated with an off-mode, where the voltage controller can be configured to receive a feedback signal and an off-mode signal from a single input and provide an output voltage, where the voltage controller can be configured to be in the off-mode when the feedback signal is less than a skip level and the feedback signal is less than an HV-control level, and where the voltage controller can be configured to be in start mode when the feedback signal is greater than the HV-control level and a voltage Vcc is below a voltage Vcc-start; and
   wherein the voltage controller can be configured:
   when in the off-mode to start generating a voltage supply signal and a drive signal when the slope of the feedback signal in time is positive and when the feedback signal is equal to about the HV-control level;
   when in the off-mode to start generating a voltage supply signal when the slope of the feedback signal in time is positive and when the feedback signal is equal to about the HV-control level.

2. The voltage controller according to claim 1, where the voltage controller can be configured when in the off-mode to start generating a drive signal and a voltage supply signal if the feedback signal is greater than the HV-control level, where the voltage controller can be configured to stop the voltage supply signal when the voltage Vcc is about equal to the voltage Vcc-start, and where the voltage controller can be configured to stop the drive signal when the feedback signal is less than about a reg-low value corresponding to the skip level.

3. The voltage controller according to claim 1, where, upon the voltage controller being configured in the off-mode to start generating the voltage supply signal and a drive signal when the slope of the feedback signal in time is positive and when the feedback signal is equal to about the HV-control level, the voltage controller can be further configured to stop the voltage supply signal when the voltage Vcc is about equal to the voltage Vcc-start, and where the voltage controller can be configured to stop the drive signal when the slope of the feedback signal is negative and the feedback signal is about equal to a reg-low value corresponding to the skip level.

4. The voltage controller according to claim 1, where, upon the voltage controller being configured in the off-mode to start generating the voltage supply signal when the slope of the feedback signal in time is positive and when the feedback signal is equal to about the HV-control level, the voltage controller can be further configured to stop the voltage supply signal when the voltage Vcc is about equal to the voltage Vcc-start, and where the voltage controller can be configured to start a drive signal when the voltage Vcc is about equal to the voltage Vcc-start and stop the drive signal when the slope of the feedback signal is negative and the feedback signal is about equal to a reg-low value corresponding to the skip level.

5. The voltage controller according to claim 1, where the voltage controller can be configured when in the off-mode to start generating a voltage supply signal if the voltage Vcc is equal to about a voltage Vcc-stop, where the voltage controller can be configured to stop the voltage supply signal when the voltage Vcc is about equal to the voltage Vcc-start, and where the voltage controller can be configured to start a drive signal when the slope of the feedback signal in time is positive and the feedback signal is about equal to the HV-control level, where the voltage controller can be configured to stop the drive signal when the slope of the feedback signal is negative and the feedback signal is about equal to a reg-low value corresponding to the skip level.

6. The voltage controller according to claim 1, where the voltage controller can be configured to start generating a supply voltage signal when a slope of the feedback signal in time is positive and the feedback signal is equal to about the HV-control level and to stop generating the supply signal when the voltage Vcc is about equal to the voltage Vcc-start.

7. The voltage controller according to claim 1, where the voltage Vcc is lower than a requested level in the off-mode, where no energy is transferred by a transformer driven by a PWM control circuit enabled by the voltage controller to supply the voltage controller, and where an HV source generator that provides an HV voltage is not activated the feedback signal is below an HV Start level which is above the skip level.

8. The voltage controller according to claim 6, where the voltage controller can be configured to generate a drive signal during the start mode when the voltage Vcc is equal to the voltage Vcc-start.

9. The voltage controller according to claim 8, further comprising:
   a standby circuit associated with a standby mode, where the voltage controller can be configured to switch to the standby mode when the feedback signal is less than the HV-control level and the voltage Vcc is greater than the voltage Vcc-stop.

10. A method of controlling a switch mode power supply comprising:
    inputting a feedback signal and an off-mode signal from a single input;
    configuring the switch mode power supply to operate in an off-mode in response to the feedback signal being less than an HV-control level and the off-mode signal being less than a skip level and to operate in a start mode in response to the feedback signal being greater than the HV-control level and a voltage $V_{cc}$ being below a voltage $V_{cc}$-start;
    inhibiting the start-mode when the feedback signal is less than the skip level;
    start generating a voltage supply signal and a drive signal when a slope of the feedback signal in time is positive and when the feedback signal is equal to about the HV-control level;

and
start generating the voltage supply signal when the voltage Vcc is equal to about a voltage Vcc-stop.

11. The method according to claim 10, further comprising:
generating a drive signal and a voltage supply signal if the feedback signal is greater than the HV-control level;
stopping the voltage supply signal when the voltage Vcc is about equal to the voltage Vcc-start; and
stopping the drive signal when the feedback signal is less than about a reg-low value corresponding to the skip level.

12. The method according to claim 10, wherein upon generating a voltage supply signal and a drive signal when the slope of the feedback signal in time is positive and when the feedback signal is equal to about the HV-control level, the method further comprising:
stop generating the voltage supply signal when the voltage Vcc is about equal to the voltage Vcc-start; and
stop generating a drive signal when the slope of the feedback signal is negative and the feedback signal is about equal to a reg-low value corresponding to the skip level.

13. The method according to claim 10, wherein upon generating a voltage supply signal when the slope of the feedback signal in time is positive and if the feedback signal is equal to about the HV-control level, the method further comprising:
stop generating the voltage supply signal when the voltage Vcc is about equal to the voltage Vcc-start;
start generating a drive signal when the voltage Vcc is about equal to the voltage Vcc-start; and
stop generating the drive signal when the slope of the feedback signal is negative and the feedback signal is about equal to a reg-low value corresponding to the skip level.

14. The method according to claim 10, wherein upon generating a voltage supply signal when the voltage Vcc is equal to about the voltage Vcc-stop, the method further comprising:
start generating a voltage supply signal if the voltage Vcc is equal to about the voltage Vcc-stop;
stop generating the voltage supply signal when the voltage Vcc is about equal to the voltage Vcc-start;
start generating a drive signal when the slope of the feedback signal in time is positive and the feedback signal is about equal to the HV-control level; and
stop generating the drive signal when the slope of the feedback signal is negative and the feedback signal is about equal to a reg-low value corresponding to the skip level.

15. A switch mode power supply controller including a feedback node for receiving a feedback signal corresponding to an output voltage of the power supply, the controller comprising:

a first comparator including a first input coupled to the feedback node, a second input coupled to a first reference voltage, and an output where the first comparator is configured to initiate a start by coupling a current to an output of the power supply;

a second comparator including a third input coupled to the feedback node, a fourth input coupled to a second reference voltage, and a second output for enabling energy transfer to the output of the power supply where the first and second comparators are configured to support start, regulation, and off-mode processes via the feedback signal;

a first current source including a first electrode configured to receive a first supply voltage and a second electrode coupled to the feedback node configured to deliver a current thereto;

a first switch including a third electrode configured to receive a first voltage, a control electrode coupled to the output of the first comparator, and a second terminal and a second current source including a fourth electrode coupled to the second terminal of the first switch and a fifth electrode coupled to the output of the power supply.

16. The switch mode power supply controller of claim 15 further including:

a first zener diode including a cathode coupled to the feedback node and an anode coupled to the first input of the first comparator;

a first resistor including a sixth electrode coupled to the first input of the first comparator and a seventh electrode configured to receive a second voltage; and a second zener diode including a second cathode coupled to the first input of the first comparator and a second anode configured to receive the second voltage.

17. The switch mode power supply controller of claim 16 further including:

a first diode including a third cathode coupled to the feedback node and a third anode coupled to the third input of the second comparator; and a second resistor including an eighth electrode coupled to the third input of the second comparator and a ninth electrode coupled to the output of the power supply.

18. The switch mode power supply controller of claim 17 further including an external pull up on the feedback node.

19. The switch mode power supply controller of claim 18 further including power factor correction feedback.

* * * * *